(12) United States Patent
Sakurada et al.

(10) Patent No.: US 10,752,208 B2
(45) Date of Patent: Aug. 25, 2020

(54) INFORMATION SYSTEM, INFORMATION PROCESSING DEVICE, INFORMATION PROCESSING METHOD, AND NON-TRANSITORY RECORDING MEDIUM HAVING PROGRAM STORED THEREIN

(71) Applicant: TOYOTA JIDOSHA KABUSHIKI KAISHA, Toyota-shi (JP)

(72) Inventors: Shin Sakurada, Toyota (JP); Koichi Ando, Nagoya (JP); Mutsumi Matsuura, Okazaki (JP); Masato Endo, Nagakute (JP); Koki Fujita, Suginami-ku (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/228,843

(22) Filed: Dec. 21, 2018

(65) Prior Publication Data

US 2019/0202402 A1 Jul. 4, 2019

(30) Foreign Application Priority Data

Dec. 28, 2017 (JP) .................................. 2017-255030

(51) Int. Cl.
*B60R 25/00* (2013.01)
*B60R 25/24* (2013.01)
*G07C 9/00* (2020.01)

(52) U.S. Cl.
CPC .......... *B60R 25/24* (2013.01); *G07C 9/00896* (2013.01); *B60R 2325/108* (2013.01); *B60R 2325/205* (2013.01)

(58) Field of Classification Search
CPC .............. B60R 25/24; B60R 2325/108; B60R 2325/205
USPC ......................................................... 340/5.6
See application file for complete search history.

(56) References Cited

U.S. PATENT DOCUMENTS

| | | | |
|---|---|---|---|
| 8,868,254 B2* | 10/2014 | Louboutin | H04W 4/021 701/2 |
| 9,508,204 B2 | 11/2016 | Oz et al. | |
| 10,414,344 B1* | 9/2019 | Northcott | B60P 3/03 |
| 2010/0253508 A1* | 10/2010 | Koen | B60R 25/102 340/539.13 |
| 2013/0332007 A1* | 12/2013 | Louboutin | H04W 4/021 701/2 |
| 2015/0332531 A1 | 11/2015 | Davidsson et al. | |

(Continued)

FOREIGN PATENT DOCUMENTS

| | | |
|---|---|---|
| JP | 2006-206225 | 8/2006 |
| JP | 2015-45141 | 3/2015 |

*Primary Examiner* — Ojiako K Nwugo
(74) *Attorney, Agent, or Firm* — Oblon, McClelland, Maier & Neustadt, L.L.P.

(57) ABSTRACT

An information system that manages use of a cargo compartment of a vehicle by a plurality of users, the information system including a server configured to: acquire, from a provider of the vehicle, target range information regarding designation of a range of users who use the cargo compartment of the vehicle; receive user registration information including attributes of a user who desires use of the cargo compartment of the vehicle; and determine, based on the target range information and the user registration information, whether the use of the cargo compartment of the vehicle by the user is permitted or not.

10 Claims, 11 Drawing Sheets

(56) References Cited

U.S. PATENT DOCUMENTS

| | | | |
|---|---|---|---|
| 2016/0196344 A1* | 7/2016 | Cremer | G06F 16/639 |
| | | | 707/758 |
| 2016/0292659 A1* | 10/2016 | Noonan | G07G 1/14 |
| 2016/0358432 A1* | 12/2016 | Branscomb | G08B 13/1965 |
| 2017/0017920 A1 | 1/2017 | Stark et al. | |
| 2018/0154867 A1* | 6/2018 | Golduber | G06Q 10/02 |
| 2019/0266562 A1* | 8/2019 | Kanaoka | G08G 1/202 |

\* cited by examiner

FIG. 3

| USAGE CLASSIFICATION | USE DATE AND TIME | USAGE STATUS | LUGGAGE ATTRIBUTES | USER INFORMATION |
|---|---|---|---|---|
| DELIVERY | 01/11/2017 12:00–1500 | COMPLETED | ... | AAA |
| PICKUP | 02/11/2017 18:00–20:00 | COMPLETED | ... | bbb |
| DELIVERY | 03/11/2017 09:00–12:00 | NOT COMPLETED | ... | *** |

FIG. 4

| IDENTIFICATION NO | VEHICLE MANUFACTURER | VEHICLE MODEL | NUMBER | PARKING LOT ADDRESS | VEHICLE POSITION | COLOR | NUMBER OF USERS | AVAILABLE TIME PERIOD | USAGE CLASSIFICATION | LUGGAGE ATTRIBUTES |
|---|---|---|---|---|---|---|---|---|---|---|
| S001 | ... | ... | xxyy | ... | LATITUDE (LA1), LONGITUDE (LO1) | WHITE | ... | 01/11/2017 12:00–15:00 | DELIVERY | VERTICAL: ** HORIZONTAL: ** DEPTH: ** WEIGHT: ** TYPE: ** |

FIG. 5

| VEHICLE ID | CLASSIFICATION FOR DESIGNATION OF USER RANGE | | | | | | | | DESIGNATION OF RANGE |
|---|---|---|---|---|---|---|---|---|---|
| | FAMILY | FRIEND | FRIENDSHIP | ACQUAINTANCE | SEX | AGE | REGIONAL AREA | RELIABILITY | OTHER OWNER | |
| ID0X01 | ✶✶✶✶ ⋮ ✶✶✶✶ | zzzz ⋮ zzzz | ID: ¥¥¥¥¥ | xxyy | ⋮ | ⋮ | ⋮ | JOB, YEARLY INCOME, AGE BAND, FAMILY MEMBER, etc<br><br>EVALUATED VALUE: ✶✶ OR MORE | PERMITTED or NOT PERMITTED | YES or NO |

FIG. 6

| VEHICLE ID | USAGE PERIOD | USAGE FORM | USAGE STATUS | LUGGAGE ATTRIBUTES | USER ID | USER TERMINAL | NUMBER OF USERS | VEHICLE POSITION | PARKING LOT ADDRESS | VEHICLE OWNER ID |
|---|---|---|---|---|---|---|---|---|---|---|
| S001 | 01/11/2017 12:00-15:00 | DELIVERY | COMPLETED | ... | PA30X21 | ZZZZZ | ... | LATITUDE (LA1), LONGITUDE (L01) | ... | X00X01 |
| | 02/11/2017 09:00-12:00 | PICKUP | COMPLETED | ... | G08X02B | AAAAA | | | | |
| | ... | ... | ... | ... | ... | ... | | | | |
| | 29/11/2017 14:00-18:00 | DELIVERY | NOT COMPLETED | ... | PA30X21 | ZZZZZ | | | | |

INFORMATION SYSTEM, INFORMATION PROCESSING DEVICE, INFORMATION PROCESSING METHOD, AND NON-TRANSITORY RECORDING MEDIUM HAVING PROGRAM STORED THEREIN

INCORPORATION BY REFERENCE

The disclosure of Japanese Patent Application No. 2017-255030 filed on Dec. 28, 2017 including the specification, drawings and abstract is incorporated herein by reference in its entirety.

BACKGROUND

1. Technical Field

The disclosure relates to an information system, an information processing device, an information processing method, and a non-transitory recording medium having a program stored therein that use an electronic key.

2. Description of Related Art

A technique for enabling delivery of a delivery object even when a receiver is absent by registering a luggage-receiving vehicle, in which the receiver will receive the delivery object, in advance and storing the delivery object in a trunk of the registered luggage-receiving vehicle has been proposed (for example, see Japanese Unexamined Patent Application Publication No. 2006-206225 (JP 2006-206225 A)). According to this technique, a receiver can designate, for example, a vehicle which is owned by the receiver as a delivery destination of a delivery object and thus can receive a delivery object when the receiver is absent without providing a dedicated luggage-receiving facility such as a home delivery locker.

SUMMARY

A user may have a desire to rent a vehicle, which has been registered as a luggage-receiving vehicle and is owned by the user, to a plurality of unspecified persons. On the other hand, a user may have a desired to rent a vehicle, which has been registered as a luggage-receiving vehicle and is owned by the user, to only acquaintances such as family members or friends instead of a plurality of unspecified persons.

The disclosure provides a technique for enabling a trunk of a vehicle to be shared by a plurality of limited users.

A first aspect of the present disclosure relates to an information system that manages use of a cargo compartment of a vehicle by a plurality of users, the information system including a server configured to: acquire, from a provider of the vehicle, target range information regarding designation of a range of users who use the cargo compartment of the vehicle; receive user registration information including attributes of a user who desires use of the cargo compartment of the vehicle; and determine, based on the target range information and the user registration information, whether the use of the cargo compartment of the vehicle by the user is permitted or not.

According to this configuration, it is possible to determine whether a request for use received from a user who desires use of the cargo compartment will be accepted based on the target range information in which the range of users who use the cargo compartment of the vehicle is designated and which is acquired from the provider of the vehicle. According to the disclosure, it is possible to limit users of the trunk of the vehicle based on the result of determination of whether the request for use will be accepted. It is possible to provide a technique of allowing a plurality of user to share a trunk of a vehicle with the users being limited.

In the above aspect, the server may be configured to grant, based on the target range information, an authority to access vehicle information for specifying the vehicle to a user who desires use of the cargo compartment of the vehicle. According to this configuration, it is possible to limit an authority to access vehicle information of the vehicle which is shared by a plurality of users based on attributes of users which are designated by the provider of the vehicle. It is possible to restrain the vehicle information from being disclosed to a user who is not desired by the provider of the vehicle.

In the above first aspect the server may be configured to issue, based on the target range information, key information of an electronic key for temporarily unlocking and locking the vehicle to a user who desires use of the cargo compartment of the vehicle.

According to this configuration, key information of an electronic key for temporarily unlocking and locking the cargo compartment of the vehicle can be issued to a user who is designated by the provider of the vehicle based on the target range information. For example, key information for allowing a driving operation of the vehicle 30 or allowing only an access to the cargo compartment can be issued based on the target range information. For example, a family member of a vehicle user can drive the vehicle to transport a delivery object to a home distant from a parking lot, and when storing luggage at night, the ignition switch may be turned ON or switched to the ACC state, and lighting can be secured by turning on the headlights, such that convenience is improved.

In the above first aspect, the target range information may include at least one of the following i) to iv): i) family member designation information for designating a family member of a provider of the vehicle in the range of users; ii) friend designation information for designating a friend of a provider of the vehicle in the range of users; iii) provider designation information for designating other providers who provide a cargo compartment of a vehicle to a plurality of users in the range of users; and iv) designation based on at least one category of: sex of the users; age of the users; a regional area in which the users live; and relative reliabilities of the users. According to this configuration, users who share the cargo compartment of the vehicle can be limited based on a user interested in a vehicle provider, experience in use of provision of a vehicle, or attributes of a user. For example, in use of the cargo compartment, it is possible to select a user who can be expected to take consideration of other users, an available time period, the vehicle, and the like.

A second aspect of the present disclosure relates to an information processing method for an information system that manages use of a cargo compartment of a vehicle by a plurality of users, the information system including a computer, the information processing method including: causing the computer to acquire, from a provider of the vehicle, target range information regarding designation of a range of users who use the cargo compartment of the vehicle; causing the computer to receive user registration information including attributes of a user who desires use of the cargo compartment of the vehicle; and causing the computer to determine, based on the target range information and the user registration information, whether the use of the cargo compartment of the vehicle by the user is permitted or not.

According to this configuration, it is possible to determine whether a request for use received from a user who desires use of the cargo compartment will be accepted based on the target range information in which the range of users who use the cargo compartment of the vehicle is designated and which is acquired from the provider of the vehicle. According to the configuration, it is possible to limit users of the trunk of the vehicle based on the result of determination of whether the request for use will be accepted. It is possible to provide a technique of allowing a plurality of user to share a trunk of a vehicle with the users being limited.

A third aspect of the present disclosure relates to a non-transitory recording medium having a program stored therein, the program causing a computer of an information system that manages use of a cargo compartment of a vehicle by a plurality of users to perform a control process, the control process including: acquiring, from a provider of the vehicle, target range information regarding designation of a range of users who use the cargo compartment of the vehicle; receiving user registration information including attributes of a user who desires use of the cargo compartment of the vehicle; and determining, based on the target range information and the user registration information, whether the use of the cargo compartment of the vehicle by the user is permitted or not.

According to this configuration, it is possible to determine whether a request for use received from a user who desire use of the cargo compartment will be accepted based on the target range information in which the range of users who use the cargo compartment of the vehicle is designated and which is acquired from the provider of the vehicle. According to the configuration, it is possible to limit users of the trunk of the vehicle based on the result of determination of whether the request for use will be accepted. It is possible to provide a technique of allowing a plurality of user to share a trunk of a vehicle with the users being limited.

A fourth aspect of the present disclosure relates to an information processing device that manages use of a cargo compartment of a vehicle by a plurality of users, the information processing device including a processor configured to: acquire, from a provider of the vehicle, target range information regarding designation of a range of users who use the cargo compartment of the vehicle; receive user registration information including attributes of a user who desires use of the cargo compartment of the vehicle; and determine, based on the target range information and the user registration information, whether the use of the cargo compartment of the vehicle by the user is permitted or not.

According to this configuration, it is possible to determine whether a request for use received from a user who desire use of the cargo compartment will be accepted based on the target range information in which the range of users who use the cargo compartment of the vehicle is designated and which is acquired from the provider of the vehicle. According to the configuration, it is possible to limit users of the trunk of the vehicle based on the result of determination of whether the request for use will be accepted. It is possible to provide a technique of allowing a plurality of user to share a trunk of a vehicle with the users being limited.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a diagram illustrating a sharing management schedule which is transmitted to an owner terminal;

FIG. 4 is a diagram illustrating vehicle information which is disclosed to a user terminal;

FIG. 5 is a diagram illustrating sharing target range information;

FIG. 6 is a diagram illustrating sharing management information;

DETAILED DESCRIPTION OF EMBODIMENTS

Hereinafter, a trunk sharing system according to an embodiment will be described with reference to the accompanying drawings. A configuration described in the following embodiment is exemplary, and the trunk sharing system is not limited to the configuration in the embodiment.

Figure 1:
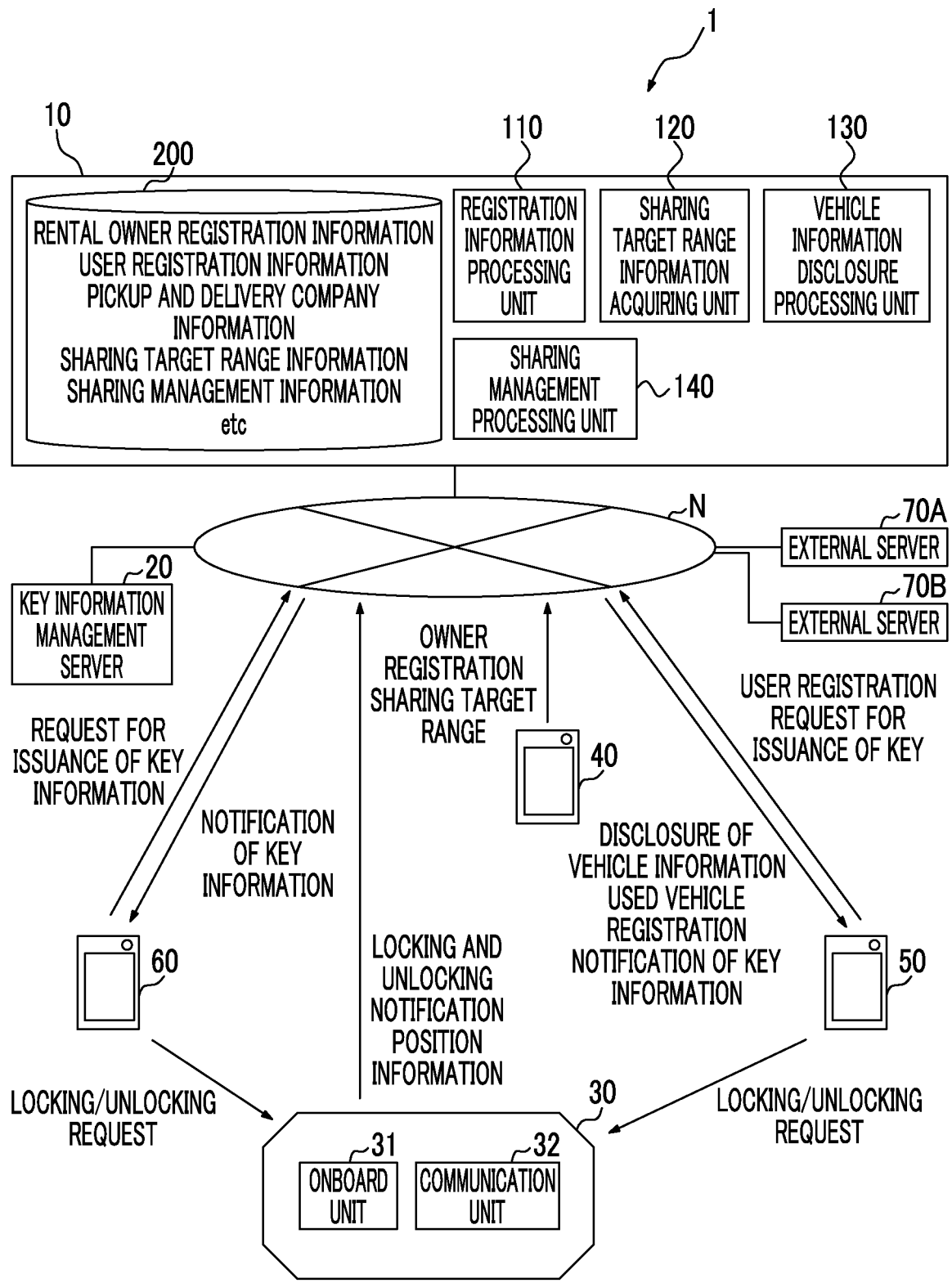
FIG. 1 is a diagram illustrating an example of a configuration of a trunk sharing system according to an embodiment.

FIG. 1 is a diagram illustrating an example of a configuration of a trunk sharing system 1 according to an embodiment. The trunk sharing system 1 is a system that provides a sharing service in which a cargo compartment (a trunk space) of a vehicle 30 can be shared (used by a plurality of users) as a pickup and delivery place for pickup and delivery objects by a plurality of users. In the following embodiment, sharing of a trunk of a vehicle is referred to as trunk sharing. A sharing service which is provided by the trunk sharing system 1 is referred to as a trunk sharing service. In addition, a trunk sharing service is also simply referred to as trunk sharing. The trunk sharing system 1 illustrated in FIG. 1 includes a sharing management server 10 and a key information management server 20. The sharing management server 10 is a computer which is used by a service provider that provides the sharing service to an owner or a rights holder (hereinafter also referred to as a "vehicle user") of a vehicle 30 registered in advance and a plurality of users who shares a cargo compartment of the vehicle 30. Here, a "service provider" is, for example, a company that provides a sharing service according to this embodiment. A service provider provides a sharing service in which a target range of users who share a cargo compartment of a vehicle 30 which can be locked and unlocked using an electronic key can be limited. Examples of the service provider include a home delivery service provider that provides a home delivery service of delivering a delivery object or the like to a delivery destination, a logistics service provider that provides a transportation service for delivery objects or the like between bases, and an electronic transaction service provider that provides online shopping as a business. The service provider may be an intermediary service provider such as a trading company or an agency that mediates sales of vehicles 30 or a rental service provider or a lease service provider that provides a rental service or a loan service for a vehicle 30, or a plurality of rental service providers or lease service providers may serve as a service provider in cooperation with each other. Alternatively, an organization collaborating with a dealer or a manufacturer of vehicles 30, a branch of a manufacturer or an associated company, a trading company or an agent, a rental service provider or a lease service provider, a home delivery service provider or a logistics service provider, or an electronic transaction service provider may serve as a service provider.

The service provider provides a sharing service in which a target range of users sharing a cargo compartment of a vehicle 30 can be limited, for example, by operating a service site including the sharing management server 10 and cooperating with the key information management server 20 that manages key information capable of allowing the cargo compartment of the vehicle 30 to be unlocked and locked.

The sharing management server 10 includes at least a sharing management database (DB) 200. The sharing management server 10 provides at least information processing functions of a registration information processing unit 110, a sharing target range information acquiring unit 120, a vehicle information disclosure processing unit 130, and a sharing management processing unit 140. Here, the sharing management server 10 may be a single computer or may be a combination of a plurality of computers, for example, a system called a cloud. Similarly, the sharing management DB 200 may be constructed by a single database server or a plurality of database servers.

In the trunk sharing system 1, the sharing management server 10 is connected to a network N. The network N includes a public network such as the Internet, a wireless network such as a mobile phone network, a dedicated network such as a virtual private network (VPN), and a network such as a local area network (LAN).

The key information management server 20 that manages key information for a cargo compartment of a vehicle 30 is connected to the network N. A communication unit 32 of a vehicle 30 and an owner terminal 40 carried by a vehicle user are also connected to the network N. A vehicle user is a key manager who has a regular key for a vehicle 30. In this embodiment, a "regular key" refers to an electronic key in which a valid period has not been set. At any time, a corresponding vehicle 30 can be unlocked and locked using the regular key.

The communication unit 32 of a vehicle 30 is a radio communication unit that can be connected to the network N. The communication unit 32 acquires a variety of information such as congestion information, road conditions, weather information, and news information based on a current position of the vehicle 30 in cooperation with a car navigation device or a global positioning system (GPS) unit (not illustrated) that is mounted on the vehicle 30. In this embodiment, for example, when starting of an engine of the vehicle 30 has been permitted, the communication unit 32 transmits position information of the vehicle at the time of starting of the engine and stopping of the engine to the sharing management server 10 via the network N. Even when starting of the engine has not been permitted, the communication unit 32 may transmit position information of the vehicle to the sharing management server 10 at constant intervals.

A user terminal 50 of a user who uses a cargo compartment of a vehicle 30 as a delivery destination of a delivery object or a user who uses a cargo compartment of a vehicle 30 as a pickup place is also connected to the network N. A pickup and delivery user terminal 60 of a service provider (hereinafter also referred to as a "pickup and delivery user"), who picks up and delivers a delivery object with a cargo compartment of a vehicle 30 as a delivery destination or picks up a luggage as a pickup object stored in a cargo compartment of a vehicle 30 and delivers the pickup object, is also connected to the network N. Examples of a pickup and delivery service provider include a home delivery service provider that provides a home delivery service of delivering a delivery object or the like to a delivery destination and a logistic service provider that provides a transportation service for a delivery object or the like between bases. An external server 70A that is operated by an electronic transaction service provider or the like that provides online shopping as a business and an external server 70B that is operated by a pickup and delivery service provider that provides a delivery service of delivering a delivery object or the like to a delivery destination or a transportation service for a delivery object or the like between bases are also connected to the network N. Another key information management server 20 which is not illustrated, a plurality of communication units 32 of vehicles 30, a plurality of owner terminals 40, a plurality of user terminals 50, a plurality of pickup and delivery user terminals 60, and a plurality of external servers 70A and 70B may be connected to the network N.

In this embodiment, a vehicle user registers a vehicle 30 of which a cargo compartment can be shared as a pickup and delivery place of a delivery object by a plurality of users in the sharing management server 10 via an owner terminal 40. The vehicle user sets a range of users who share the cargo compartment via an application program for supporting a trunk sharing service (hereinafter also referred to as a support application), which is provided from the sharing management server 10 at the time of registration of the vehicle 30 or after registration of the vehicle 30. Here, the setting of the range of users who can share the cargo compartment of the vehicle 30 and which is registered by the vehicle user is also referred to as "sharing target range information." The sharing target range information will be described later. When a request for use of the trunk sharing service has been received from a user, the sharing management server 10 limits the use of a sharable cargo compartment based on the sharing target range information set for the vehicle 30. For example, when attributes of a user are included in a sharing target range, the sharing management server 10 discloses information of the vehicle 30 of which the trunk is shared to the user. On the other hand, for example, when attributes of a user are not included in the sharing target range, the sharing management server 10 does not disclose the information of the vehicle 30 of which the trunk is shared to the user. When a request for use has been received from a user for whom use of the cargo compartment is permitted, the sharing management server 10 notifies the cooperating key information management server 20 that the request of use has been received. The key information management server 20 issues key information of allowing a user terminal 50 and a pickup and delivery user terminal 60 to serve as a temporary electronic key, for example, based on information including identification information of the vehicle 30 and time information when the notification has been received from the sharing management server 10. The issued key information is transmitted to the user terminal 50 and the pickup and delivery user terminal 60, for example, via the sharing management server 10. In the following description, it is assumed that a cargo compartment of a vehicle 30 is designated as a delivery destination of a delivery object or a pickup and delivery place of stored luggage and a pickup and delivery user performs delivery of a delivery object to the cargo compartment of the vehicle 30 or pickup of luggage stored in the cargo compartment of the vehicle 30.

The key information management server 20 is, for example, a computer such as a personal computer (PC), a work station (WS), or a server which is owned by a management service provider that manages key information for allowing a vehicle 30 to be locked and unlocked. Here, the key information management server 20 may be a single computer or a system such as a cloud including a combination of a plurality of computers. Examples of the management service provider owning the key information management server 20 include a branch of a manufacturer of vehicles 30 or an associated company and a service provider that performs a management operation of key information with commission from the manufacturer or the like or a provider.

The key information management server 20 issues key information based on a form of use of a user who uses a cargo compartment of a vehicle 30 as a delivery destination of a delivery object or a user who uses a cargo compartment of a vehicle 30 as a pickup place of a delivery object in cooperation with the sharing management server 10. Here, key information is authentication information for using a vehicle 30 which can be locked and unlocked using an electronic key. For example, vehicle-side authentication information is registered in an onboard unit 31 mounted in the vehicle 30. The vehicle-side authentication information registered in the onboard unit 31 is managed, for example, by the key information management server 20 in correlation with identification information of the vehicle 30 in which the onboard unit 31 is mounted.

When a request for issuance of a one-time key has been transmitted from the sharing management server 10, the key information management server 20 issues authentication information for temporarily enabling locking and unlocking the vehicle 30 as key information based on the vehicle-side authentication information correlated with the vehicle 30. The issued one-time key is transmitted to an owner terminal 40, a user terminal 50, or a pickup and delivery user terminal 60 from which a request for issuance has been transmitted via the network N. For example, when authentication to the onboard unit 31 using the one-time key of the user terminal 50 has succeeded, a user can lock and unlock a door of a cargo compartment of a vehicle 30 via the onboard unit 31.

Figure 2:
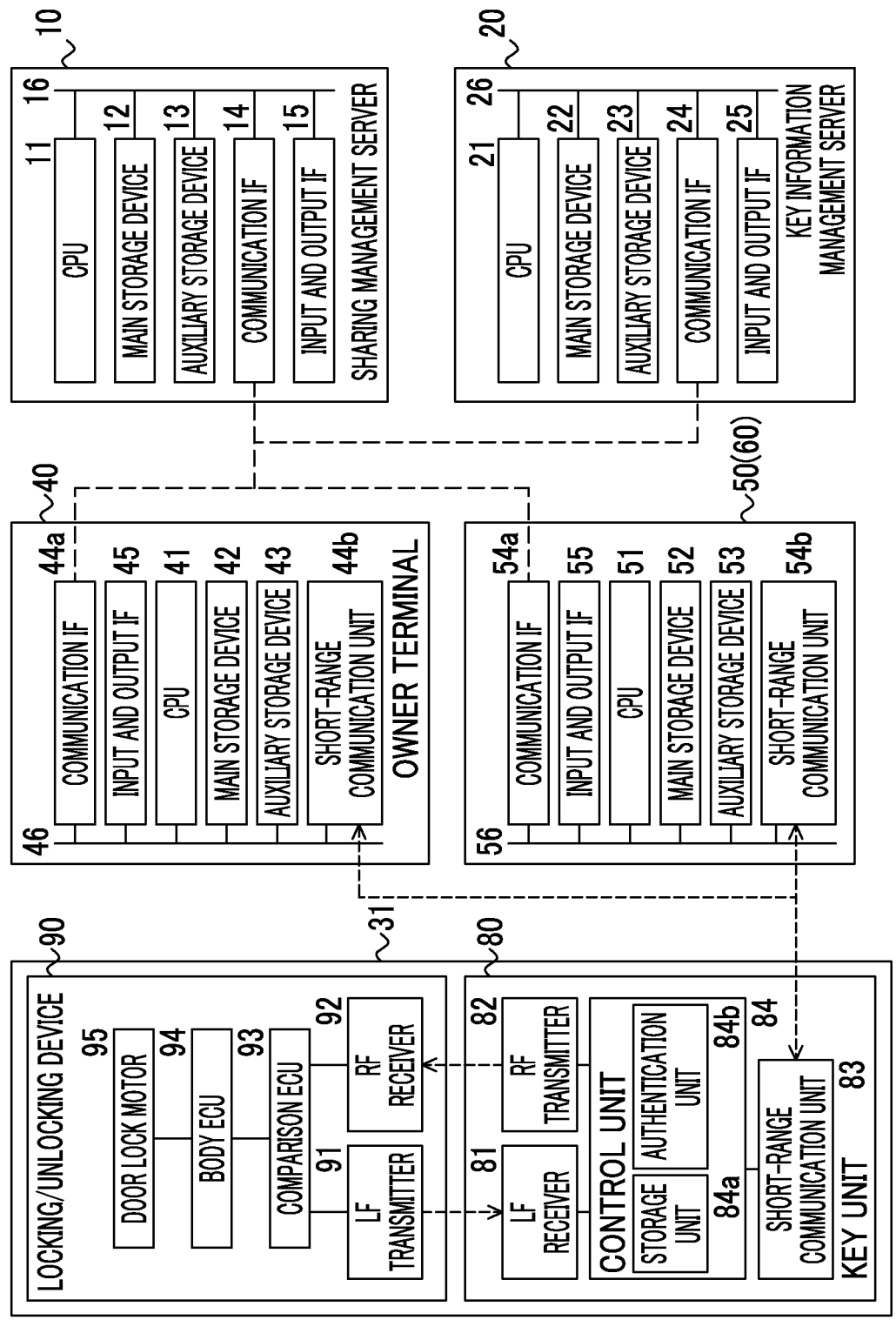
FIG. 2 is a diagram illustrating an example of hardware configurations of an onboard unit, a user terminal, an owner terminal, a sharing management server, and a key information management server.

FIG. 2 is a diagram illustrating an example of hardware configurations of the sharing management server 10, the key information management server 20, the onboard unit 31, an owner terminal 40, and a user terminal 50 which constitute the trunk sharing system 1. The configuration of the pickup and delivery user terminal 60 illustrated in FIG. 1 is the same as the configuration of the user terminal 50 and thus is not illustrated in FIG. 2. The configurations of the external servers 70A and 70B illustrated in FIG. 1 are the same as the configuration of the sharing management server 10 and thus are not illustrated in FIG. 2. In this embodiment, the onboard unit 31 includes a key unit 80 and a locking/unlocking device 90. The key unit 80 includes the same radio interface as an electronic key (hereinafter referred to as a portable unit) which is called a smart key, and communicates with an existing locking/unlocking device 90 constituting the onboard unit 31. A user who uses a cargo compartment of a vehicle 30 as a pickup place of a delivery object can perform locking and unlocking of a cargo compartment or a passenger compartment of a vehicle 30 without using a physical key, for example, by causing the key unit 80 to authenticate authentication information stored in the user terminal 50. That is, the key unit 80 performs short-range radio communication with the owner terminal 40, the user terminal 50, and the pickup and delivery user terminal 60 which store the authentication information (hereinafter referred to as the user terminal 50 or the like), and determines whether it serves as an electronic key of the vehicle 30 based on the result of authentication for the user terminal 50 or the like.

The user terminal 50 or the like receives authentication information for locking and unlocking the cargo compartment, which is issued by the key information management server 20, via the sharing management server 10 as described above, for example, when accessing the cargo compartment of the vehicle 30 for delivery and pickup of luggage. Then, the authentication information transmitted from the user terminal 50 or the like to the key unit 80 is compared with vehicle-side authentication information stored in advance in the key unit 80. When the authentication process has succeeded, the user terminal 50 or the like is authenticated as a terminal that rightfully operates the onboard unit 31. When the user terminal 50 or the like has been authenticated, the key unit 80 transmits a key ID of the vehicle 30, which is stored in advance in the key unit 80 and correlated with the vehicle-side authentication information, to the locking/unlocking device 90 along with a locking/unlocking signal. The locking/unlocking device 90 locks or unlocks the vehicle 30 when the key ID received from the key unit 80 coincides with a key ID stored in advance in the locking/unlocking device 90. The key ID stored in advance in the key unit 80 may be encrypted with vehicle-side authentication information. In this case, when the authentication process of the user terminal 50 or the like has succeeded, the key unit 80 can decrypt the key ID with the vehicle-side authentication information and transmit the decrypted key ID to the locking/unlocking device 90. The key unit 80 and the locking/unlocking device 90 operate with electric power which is supplied from a battery mounted in the vehicle 30 or a general battery. The key unit 80 and the locking/unlocking device 90 may operate with electric power which is supplied from a general battery in addition to a battery mounted in the vehicle 30.

The locking/unlocking device 90 is a device that locks and unlocks a door of a passenger compartment or a cargo compartment of the vehicle 30 and is an existing device that constitutes a part of a smart key system. The locking/unlocking device 90 locks and unlocks the door of the vehicle 30 in accordance with a locking signal and an unlocking signal which are transmitted from a portable unit corresponding to the vehicle 30 using radio waves of a radio frequency (hereinafter referred to as RF) band. The locking/unlocking device 90 also has a function of transmitting radio waves of a low frequency (hereinafter referred to as LF) band for detecting the portable unit.

In this embodiment, the key unit 80 instead of the portable unit controls locking and unlocking of the door of the vehicle 30 by transmitting and receiving radio waves of an RF band and an LF band to and from the locking/unlocking device 90. In the following description, unless otherwise mentioned, the communication destination of the locking/unlocking device 90 is limited to the key unit 80.

The locking/unlocking device 90 includes an LF transmitter 91, an RF receiver 92, a comparison ECU 93, a body ECU 94, and a door lock actuator 95. The LF transmitter 91 is means that transmits radio waves of an LF band (for example, 100 KHz to 300 KHz) for detecting (polling) the key unit 80. The LF transmitter 91 is incorporated, for example, in a center console or in the vicinity of a steering wheel in the passenger compartment. The RF receiver 92 is means that receives radio waves of an RF band (for example, 100 MHz to 1 GHz) transmitted from the key unit 80. The RF receiver 92 is incorporated at any position in the passenger compartment.

The comparison ECU 93 is a computer that performs control for locking and unlocking the door of the passenger compartment or the cargo compartment of the vehicle 30 based on a signal (a locking signal or an unlocking signal) transmitted from the key unit 80 using radio waves of an RF band. The comparison ECU 93 is constituted, for example, by a microcomputer. In the following description, the locking signal and the unlocking signal are collectively referred to as a locking/unlocking signal. The term, a locking/unlocking signal, refers to at least one of a locking signal and an unlocking signal.

The comparison ECU 93 authenticates whether the locking/unlocking signal transmitted from the key unit 80 has been transmitted from a rightful device. Specifically, the comparison ECU 93 determines whether the key ID included in the locking/unlocking signal coincides with the key ID stored in advance in a storage unit of the comparison ECU 93. Then, the comparison ECU 93 transmits an unlocking command or a locking command to the body ECU 94 based on the determination result. The unlocking command or the locking command is transmitted via an onboard network such as a controller area network (CAN).

The body ECU 94 is a computer that executes body control of the vehicle 30. The body ECU 94 has a function of simultaneously or independently performing unlocking and locking of a passenger compartment door or a cargo compartment door of the vehicle 30 by controlling the door lock actuator 95 based on the unlocking command or the locking command received from the comparison ECU 93. The comparison ECU 93 and the body ECU 94 may be embodied as a single body.

The door lock actuator 95 is an actuator that locks and unlocks a passenger compartment door or a rear gate of the vehicle 30 and a cargo compartment door which is opened and closed at the time of storage of luggage to the cargo compartment of the vehicle 30. The door lock actuator 95 operates based on a signal transmitted from the body ECU 94. The door lock actuator 95 may be configured to independently lock and unlock the passenger compartment door or the rear gate and the cargo compartment door of the vehicle 30.

The key unit 80 will be described now. The key unit 80 is a device that is disposed at a predetermined position (for example, inside a glove box) in the passenger compartment of the vehicle 30. The key unit 80 has a function of authenticating a user terminal 50 or the like by performing short-range radio communication with the user terminal 50 or the like and a function of transmitting a locking/unlocking signal using radio waves of an RF band based on the authentication result. The key unit 80 includes an LF receiver 81, an RF transmitter 82, a short-range communication unit 83, and a control unit 84.

The LF receiver 81 is means that receives a polling signal transmitted from the locking/unlocking device 90 using radio waves of an LF band. The LF receiver 81 includes an antenna for receiving radio waves of an LF band (hereinafter referred to as an LF antenna). The RF transmitter 82 is means that transmits a locking/unlocking signal to the locking/unlocking device 90 using radio waves of an RF band.

The short-range communication unit 83 is means that communicates with the user terminal 50 or the like. The short-range communication unit 83 performs communication in a short range (at a distance over which communication can be performed between the interior and the exterior of the vehicle) using a predetermined radio communication standard.

In this embodiment, the short-range communication unit 83 performs data communication based on a Bluetooth (registered trademark) Low Energy standard (hereinafter referred to as BLE). BLE is a low-energy communication standard using Bluetooth, and is characterized in that communication can be started immediately when a communication partner has been detected without requiring pairing between devices. In this embodiment, BLE is exemplified, but another radio communication standard can also be used. For example, near field communication (NFC), ultra wideband (UWB), or WiFi (registered trademark) may be used.

The control unit 84 is a computer that performs short-range radio communication with the user terminal 50 or the like via the short-range communication unit 83 and performs control for authenticating the user terminal 50 or the like and control for transmitting a locking/unlocking signal based on the authentication result. The control unit 84 is constituted, for example, by a microcomputer.

The control unit 84 includes a storage unit 84*a* and an authentication unit 84*b*. A control program for controlling the key unit 80 is stored in the storage unit 84*a*. The control unit 84 may realize various functional units including the authentication unit 84*b* by causing a CPU (not illustrated) to execute the control program stored in the storage unit 84*a*. For example, the control unit 84 realizes a function of receiving a polling signal transmitted as radio waves of an LF band from the locking/unlocking device 90 via the LF receiver 81, a function of transmitting a locking/unlocking signal as radio waves of an RF band to the locking/unlocking device 90 via the RF transmitter 82, a function of processing communication with the user terminal 50 or the like which is performed by the short-range communication unit 83, and a function of generating a locking/unlocking signal when authentication of the user terminal 50 or the like by the authentication unit 84*b* has succeeded.

The authentication unit 84*b* authenticates the user terminal 50 or the like based on authentication information included in a locking request or an unlocking request (hereinafter collectively referred to as a locking/unlocking request) transmitted from the user terminal 50 or the like. Specifically, the authentication unit 84*b* compares the authentication information transmitted from the user terminal 50 or the like with the vehicle-side authentication information stored in the storage unit 84*a*, and determines that the authentication has succeeded when the two pieces of authentication information satisfy a predetermined relationship. When the two pieces of authentication information do not satisfy the predetermined relationship, the authentication unit 84*b* determines that the authentication has failed. Here, the predetermined relationship includes a case in which the vehicle-side authentication information stored in the storage unit 84*a* coincides with the authentication information transmitted from the user terminal 50 or the like, a case in which results of predetermined processes such as encryption and decryption using the two pieces of authentication information (vehicle-side authentication information, and authentication information transmitted from the user terminal 50 and the like) coincide with each other, and a case in which a result of decryption on one of the two pieces of authentication information coincides with that on the other thereof.

When the authentication of the user terminal 50 or the like by the authentication unit 84b has succeeded, a locking/unlocking signal generated in response to a request received from the user terminal 50 or the like is transmitted to the locking/unlocking device 90 via the RF transmitter 82. The authentication method which is performed by the authentication unit 84b may be a method of verifying coincidence through simple comparison between the two pieces of authentication information or may be a method using an asymmetric cipher. In the following description, the vehicle-side authentication information stored in the key unit 80 is referred to as device authentication information and the authentication information transmitted from the user terminal 50 or the like is referred to as terminal authentication information, if necessary. The key unit 80 transmits the key ID along with the locking/unlocking signal to the locking/unlocking device 90.

The sharing management server 10 has, for example, a general configuration of a computer. The sharing management server 10 includes a central processing unit (CPU) 11, a main storage device 12, an auxiliary storage device 13, a communication interface (IF) 14, and an input and output interface (IF) 15 which are connected to each other via a connection bus 16. The main storage device 12 and the auxiliary storage device 13 are recording mediums which can be read by a computer. One or more elements thereof may be provided or some elements may not be provided.

The CPU 11 is a central processing operation device that executes control of the computer as a whole. The CPU 11 is also referred to as a microprocessor unit (CPU) or a processor. Here, the CPU 11 is not limited to a single processor, and may have a multi-processor configuration. A single CPU connected to a single socket may have a multi-core configuration. The CPU 11 provides a function corresponding to a predetermined purpose, for example, by loading a program stored in the auxiliary storage device 13 into a work area of the main storage device 12 and executing the program to control peripherals.

The main storage device 12 stores computer programs which are executed by the CPU 11, data which is processed by the CPU 11, and the like. The main storage device 12 includes, for example, a flash memory, a random access memory (RAM), and a read only memory (ROM). The auxiliary storage device 13 stores various programs and various data in a recording medium in a readable and writable manner. Examples of the auxiliary storage device 13 include a flash memory, an erasable programmable ROM (EPROM), a silicon disk, and a hard disk drive (HDD). Examples of the auxiliary storage device 13 include a portable recording medium such as a universal serial bus (USB) memory or a disc recording medium such as a compact disc (CD) or a digital versatile disc (DVD). For example, an operating system (OS), various programs, and various tables are stored in the auxiliary storage device 13. The OS includes, for example, a communication interface program that transmits and receives data to and from another information processing device connected to the network N via the communication IF 14.

The communication IF 14 is a communication IF with the network N. Examples of the communication IF include a LAN interface board or a radio communication circuit for radio communication. The input and output IF 15 is an interface that inputs and outputs data with a device connected to the computer. For example, input devices such as a keyboard, a pointing device such as a touch panel or a mouse, and a microphone are connected to the input and output IF 15. An operation instruction or the like from an operator who operates the input devices can be received via the input and output IF 15. For example, output devices such as a display device such as an LCD, an electroluminescence (EL) panel, or an organic LE panel and a speaker are connected to the input and output IF 15. Data or information which is processed by the CPU 11 and data or information stored in the main storage device 12 and the auxiliary storage device 13 are output via the input and output IF 15.

The sharing management server 10 provides the information processing functions of at least the registration information processing unit 110, the sharing target range information acquiring unit 120, the vehicle information disclosure processing unit 130, and the sharing management processing unit 140 by causing the CPU 11 to execute a program. At least some of the processing functions may be provided by a digital signal processor (DSP), an application specific integrated circuit (ASIC), a graphics processing unit (GPU), or the like. At least some of the processing functions may be provided by a dedicated large-scale integration (LSI) device such as a field-programmable gate array (FPGA), a numerical processor, and an image processor or other digital circuits.

The registration information processing unit 110 receives rental owner registration information input via an owner terminal 40 and registers the received rental owner registration information in the sharing management DB 200 in correlation with identification information (a phone number, an IP address, a MAC address, and the like) of the owner terminal 40. The registration information processing unit 110 receives user registration information input via a user terminal 50 and registers the received user registration information in the sharing management DB 200 in correlation with identification information (a phone number, an IP address, a MAC address, and the like) of the user terminal 50. The registration information processing unit 110 acquires an identification number of a support application which is provided to the owner terminal 40 and the user terminal 50 and registers the acquired identification number of the support application in the rental owner registration information and the user registration information.

The sharing target range information acquiring unit 120 acquires sharing target range information input via the owner terminal 40 and registers the acquired sharing target range information in the sharing management DB 200 in correlation with identification information of a vehicle user. The sharing target range information acquiring unit 120 registers information indicating a friendship specified based on a user ID of an SNS or the like which is used by the vehicle user in the sharing target range information.

The vehicle information disclosure processing unit 130 determines whether information of vehicles 30 of which a trunk is shared is to be disclosed to a user based on the user registration information registered by the user and the sharing target range information set by the vehicle user. The sharing management processing unit 140 registers a use target vehicle selected from the vehicles 30 disclosed to the user in the sharing management DB 200 and manages a trunk sharing usage status for each vehicle. The vehicle information disclosure processing unit 130 and the sharing management processing unit 140 will be described later with reference to FIGS. 9 to 11.

Similarly to the sharing management server 10, the key information management server 20 includes a CPU 21, a main storage device 22, an auxiliary storage device 23, a communication IF 24, and an input and output IF 25 which are connected to each other via a connection bus 26. The configurations of the CPU 21, the main storage device 22, the auxiliary storage device 23, the communication IF 24, and the input and output IF 25 are the same as the configurations of the CPU 11, the main storage device 12, the auxiliary storage device 13, the communication IF 14, and the input and output IF 15 of the sharing management server 10 and thus description thereof will not be repeated.

The owner terminal 40 and the user terminal 50 are small portable computers such as a smartphone, a mobile phone, a tablet terminal, a personal information terminal, or a wearable computer (such as a smart watch). The owner terminal 40 may be a personal computer (PC) that is connected to the sharing management server 10 via the network N1.

The owner terminal 40 includes a CPU 41, a main storage device 42, an auxiliary storage device 43, a communication IF 44a, a short-range communication IF 44b, and an input and output IF 45 which are connected to each other via a connection bus 46. The configurations of the CPU 41, the main storage device 42, the auxiliary storage device 43, and the input and output IF 45 are the same as the configurations of the CPU 11, the main storage device 12, the auxiliary storage device 13, and the input and output IF 15 of the sharing management server 10 and thus description thereof will not be repeated. The communication IF 44a is a communication circuit that accesses a public network such as the Internet via a radio network such as a mobile phone network and performs data communication with the sharing management server 10. The short-range communication IF 44b is a communication circuit that performs short-range communication using a predetermined communication standard. Examples of the predetermined communication standard include BLE, NFC, and UWB. The input and output IF 45 may include an input device such as a push button or ma include an input device for inputting a video or an image of a camera or the like.

The owner terminal 40 is connected to the sharing management server 10 by causing the CPU 41 to execute a browser program. In the owner terminal 40, rental order registration of a vehicle 30 having a cargo compartment which can be shared as a pickup and delivery place of a delivery object by a plurality of users is performed through an operation input from the vehicle user. After the rental owner registration has been performed, a support application for supporting the trunk sharing service is provided from the sharing management server 10. In the owner terminal 40, sharing target range information, that is, a range of users who can share a cargo compartment of the vehicle 30 owned by the owner, is set, for example, by executing the installed support application. The range of users may be set at the time of registration of an owner. The vehicle user updates the set range of users who share the cargo compartment of the vehicle 30 by executing the support application.

The owner terminal 40 is notified of a management schedule for use of a rental cargo compartment as a pickup and delivery place of a delivery object by the sharing management server 10 connected thereto by causing the CPU 41 to execute the support application. The sharing management schedule is notified at constant intervals such as a day or a week. In the owner terminal 40, the notified management schedule is displayed on a display device such as an LCD as contents which are described in a hypertext markup language (HTML) or the like.

FIG. 3 is a diagram illustrating a sharing management schedule of which the owner terminal 40 is notified. In FIG. 3, an example of the sharing management schedule which has been transmitted in a table structure is illustrated. In FIG. 3, at least usage classification which is a usage type of a cargo compartment to be shared, a use date and time of the cargo compartment, a usage status, luggage attributes, and user information are included as table fields. In the field of usage classification, information for specifying whether the cargo compartment is used as a delivery destination or as a pickup place is presented. For example, "delivery" is presented when the cargo compartment is sued as a delivery destination, and "pickup" is presented when the cargo compartment is used as a pickup place. In the field of use date and time, use date and time information for the cargo compartment is presented. Regarding a use time period, a time period with a unit time width such as one hour or two hours is presented. In the field of usage status, information indicating whether usage of the cargo compartment has been completed is presented. In the field of luggage attributes, attributed information such as a weight, a size, a type of delivery luggage is presented. In the field of user information, information for specifying users designated in a sharing target range which will be described later is presented. When the sharing target range for the vehicle 30 limits the range of users to a family member, a near acquaintance, or the like, for example, names of family members or acquaintances are set in the field of user information in the sharing management schedule. The vehicle user can understand a use state in which the usage of the cargo compartment of the vehicle 30 which is used as a pickup and delivery place of delivery luggage is limited by browsing the notified sharing management schedule.

Similarly to the owner terminal 40, the user terminal 50 includes a CPU 51, a main storage device 52, an auxiliary storage device 53, a communication IF 54a, a short-range communication IF 54b, and an input and output IF 55 which are connected to each other via a connection bus 56. The configurations thereof are the same as the configurations of the CPU 41, the main storage device 42, the auxiliary storage device 43, the communication IF 44a, the short-range communication IF 44b, and the input and output IF 45 of the owner terminal 40 and thus description thereof will not be repeated.

The user terminal 50 is connected to the sharing management server 10 by causing the CPU 51 to execute a browser program. In the user terminal 50, user registration for the vehicle 30 having a cargo compartment which can be shared as a pickup and delivery place of delivery luggage by a plurality of users is performed through an operation input from a user. After the user registration has been performed, a support application is provided from the sharing management server 10. In the user terminal 50, for example, information of vehicles 30 of which a trunk can be shared is disclosed to the user by executing the installed support application. In the user terminal 50, the disclosed information of vehicles 30 is displayed on a display device such as an LCD as contents which are described in an HTML or the like.

FIG. 4 is a diagram illustrating information of a vehicle 30 which is disclosed to a user in a user terminal 50. FIG. 4 illustrates an example of the information of a vehicle 30 in a form of a table. The information of a vehicle 30 includes information for specifying a vehicle 30 of which a trunk is shared, a parking position of the vehicle 30, and usage information of trunk sharing. The table structure illustrated in FIG. 4 includes fields of identification number, vehicle manufacturer, vehicle model, number, parking lot address, vehicle position, color, number of uses, available time period, usage classification, and luggage attribute. The identification number is a serial number of a vehicle which can be used in trunk sharing by a user. The vehicle manufacturer is information indicating a manufacturer that has manufactured the vehicle. The vehicle model is information indicating a type to which the vehicle belongs such as a sedan or a minivan. The number is a vehicle registration number marked on a sign (a number plate) attached to the front and rear of the vehicle. The parking lot address is address information indicating a location of a parking lot in which the vehicle is parked. The vehicle position is information indicating a parking position in the parking lot. Latitude and longitude of the position at which the vehicle is parked may be presented as the vehicle position. The color is information a color type of the vehicle. Image information of the vehicle may be presented instead of the color. The number of users is the number of users who use trunk sharing of the vehicle. The available time period is information indicating a date and time and a time period in which a reservation for use of the vehicle is available. An unavailable time period and a reserved time period may be presented instead of the available time period. The usage classification is a classification indicating the purpose of trunk sharing such as only a delivery destination or only a pickup place. The luggage attribute is limitation of weight, size, type, or the like of luggage which is usable in trunk sharing. The luggage attribute may be described in a natural language. The luggage attribute may be a sequence of numerical values, that is, a list of numerical values, indicating numerical values of weight, size, type, or the like of luggage which is usable in trunk sharing. Data of the luggage attribute may be described in another table and a structure for link thereto by a pointer may be provided.

The user terminal 50 is connected, for example, to an external server 70A that is operated by an electronic transaction service provider or the like that provides online shopping as a business and an external server 70B that is operated by a pickup and delivery service provider by causing the CPU 51 to execute a browser program. The user terminal 50 designates the disclosed information of the vehicle 30 as a delivery destination of a purchased object or a pickup place of a pickup object through an operation input from the user.

In the sharing management server 10, at least rental owner registration information, user registration information, pickup and delivery service provider information, sharing target range information, and sharing management information are stored in the sharing management DB 200.

The rental owner registration information is registration information of a vehicle user who has been registered in the sharing management server 10. The rental owner registration information includes identification information for uniquely identifying the vehicle user, an address, contact information other than the owner terminal 40, a registration date, a type of the vehicle user, vehicle identification information for identifying the vehicle 30, information for specifying a parking position of the vehicle 30, identification information of the communication unit 32 mounted in the vehicle 30, an insurance number of the vehicle 30, and identification information of the owner terminal 40. The type of the vehicle user includes information such as an individual person, a group, or a service provider. The vehicle identification information includes, for example, a format, a year of manufacture, engine displacement, a vehicle model, a manufacturing serial number, and a vehicle registration number certificate (a car number) of the vehicle 30. The information for specifying the parking position of the vehicle 30 includes an address of a parking lot in which the vehicle 30 is parked at the time of use of trunk sharing and a parking position in the parking lot. Latitude and longitude acquired via the communication unit 32 may be included instead of the parking position in the parking lot. The information for specifying the parking position of the vehicle 30 may include image information of the vehicle 30 and image information of the parking position at the time of providing trunk sharing. The identification information of the communication unit 32 includes an IP address and a media access control address (MAC address). The identification information of the owner terminal 40 includes a phone number, an IP address, an e-mail address, and a MAC address of the owner terminal 40 and an identification number of a support application provided from the sharing management server 10.

The rental owner registration information includes a rental period for trunk sharing, a usage type of trunk sharing, limitation of luggage attributes, a rate schedule, and a payment account. The rate schedule may be classified, for example, depending on a usage type, a use time period, a use frequency, luggage attributes (such as a weight, a size, and a type), and the like in trunk sharing. The rental owner registration information is registered in the sharing management DB 200 by the sharing management server 10 or a computer cooperating with the sharing management server 10 based on information at the time of registration. The rental owner registration information may be registered in the sharing management DB 200 by a service provider or a manager of the sharing management DB 200 in commission from the service provider based on information at the time of rental owner registration.

The user registration information is user information of trunk sharing users who are registered in the sharing management server 10. The user registration information includes identification information for uniquely identifying a user, a name, an address, an age, a sex, a usage type of trunk sharing, contact information other than the user terminal 50, and identification information of the user terminal 50. When a friendship is included in the sharing target range information, the user registration information includes information for specifying the friendship of the user. An example of the information for specifying the friendship of the user is a user ID of a social networking service (SNS). The identification information of the user terminal 50 includes a phone number, an IP address, an e-mail address, and a MAC address of the user terminal 50 and an identification number of a support application provided from the sharing management server 10. Registration of the user registration information in the sharing management DB 200 is performed in the same way as the rental owner registration information.

The pickup and delivery service provider information is information of a pickup and delivery user who has been registered in the sharing management server 10. The pickup and delivery service provider information includes identification information for uniquely identifying a pickup and delivery user, a name, a business code of the pickup and delivery user, service base information of the pickup and delivery user, contact information, and identification information of a pickup and delivery user terminal 60 which is used by a pickup and delivery user. The identification information of the pickup and delivery user terminal 60 includes a phone number, an IP address, an e-mail address, and a MAC address of the pickup and delivery user terminal 60 and an identification number of a support application provided from the sharing management server 10.

The pickup and delivery service provider information includes a term of contract, a rate schedule, and a payment account for a key issuance service in trunk sharing. The rate schedule may be classified, for example, depending on a usage type, a pickup and delivery time period, a pickup and delivery frequency, and the like of trunk sharing. Registration of the pickup and delivery service provider information in the sharing management DB 200 is performed in the same way as the rental owner registration information.

The sharing target range information is information for designating a range of users who use trunk sharing of vehicles 30 registered in the sharing management server 10 and is set by vehicle users of the vehicles 30. The sharing target range information is stored in the sharing management DB 200 in correlation with identification information for uniquely identifying a vehicle user. Registration of the sharing target range information in the sharing management DB 200 is performed in the same way as the rental owner registration information. When one rental owner provides a plurality of vehicles to the trunk sharing service, the sharing target range information may be designated for each vehicle.

FIG. 5 is a diagram illustrating sharing target range information. In FIG. 5, sharing target range information stored in the sharing management DB 200 is illustrated in a form of a table. For example, the sharing target range information includes family member designation of a vehicle user, friend designation of the vehicle user, friendship designation of the vehicle user, acquaintance designation close to a dwelling address of the vehicle user, designation of sex or age of a user, and designation of permission of a plurality of unspecified users. The sharing target range information includes designation of a regional area in which a user lives, designation of another vehicle owner who provides a trunk of a vehicle to trunk sharing, and designation of a user having a relatively high reliability. In FIG. 5, the sharing target range information includes a field of user range designation classification which is a field for designating a range of users. A sharing target range designated by the vehicle user is stored as a sub field of the field of user range designation classification. The vehicle owner ID is identification information of the vehicle user. Names of a family member, a friend, and an acquaintance who are designated as a user of trunk sharing are stored in family member, friend, and acquaintance. A friend designated by the vehicle owner may be designated, for example, by a friendship of an SNS or the like which is used by the vehicle user. In order to specify such a friendship, an ID given from an SNS which is used by the vehicle user is stored as the information for specifying the friendship. For example, the sharing management server 10 accesses a corresponding SNS service site based on the ID given to the vehicle user and specifies a friendship of the vehicle user via an application programming interface (API). The sharing management server 10 can import information of the friendship of the vehicle owner specified from the SNS or the like into the sharing target range information. Sex and age designated for a user are stored in the fields of sex and age. The age may be designated in a format of "age of  to ," may be designated in a threshold format of "equal to or greater than age of ," or may be designated in a period format (for example, a format of "twenties", "thirties", or the like). A regional area in which a user lives and which is designated for the user is stored in the regional area. The regional area may be designated by an address indicating the regional area or may be designated by latitude and longitude indicating the regional area. For example, the regional area may be designated in a format of within  km from a parking lot in which the vehicle 30 is parked. A relative reliability designated for the user is stored in the reliability. As the reliability, an evaluation value for permitting use is designated along with items for evaluating the relative reliability such as a family structure, an age, a job, and a yearly income of a user. Points are allocated to the types of the items and a user can be designated through comparison between the points acquired for each item and the evaluation value. In use of trunk sharing, for example, payment of a predetermined amount of margin may be requested and the payment of the margin may be substituted for the evaluation item. When the margin has been paid, the points can be determined to be equal to or greater than the evaluation value. In the field of other owner, "permitted" is stored when use permission by other vehicle owner who provides a trunk of a vehicle to the trunk sharing is designated, and "not permitted" is stored when use by other vehicle owner is not permitted. In the field of designation of range, information of whether a range of users for using a trunk has been designated is stored. "NO" is stored when the vehicle owner does not limited the range of users and rents the vehicle to a plurality of unspecified users, and "YES" is stored when the range of users is limited. When "YES" is stored in the field of designation of range, information for designating the range of users is stored in at least another sub field. A vehicle user can select and set a desired item from the sharing target range information illustrated in FIG. 5. An item which has not been set by the vehicle user in the sharing target range information illustrated in FIG. 5 is handled not to be limited by the sharing target range information.

The sharing management information is information for managing a usage status of each vehicle which is rented to trunk sharing. FIG. 6 is a diagram illustrating sharing management information. In FIG. 6, the sharing management information stored in the sharing management DB 200 is illustrated in a table structure. The sharing management information includes identification information for identifying a vehicle 30, the number of users who share a trunk, identification information of users, a usage type, a use completed/not-completed status, a usage period (including a time period of a usage date), luggage attributes, and identification information of a vehicle user. The sharing management information includes identification information of a user terminal 50 and information for specifying a parking position of the vehicle 30. In FIG. 6, items for storing the above-mentioned information are displayed as fields of vehicle ID, usage period, usage type, usage status, luggage attribute, user ID, user terminal, number of users, vehicle position, parking lot address, and vehicle owner ID. In FIG. 6, the field of vehicle ID corresponds to the identification information for identifying a vehicle 30, the field of number of users corresponds to the number of users who share the trunk. The field of user ID corresponds to the identification information of a user, and the field of user terminal corresponds to the identification information of a user terminal 50. The fields of vehicle position and parking lot address corresponds to the information for specifying the parking position of the vehicle 30, and the field of vehicle owner ID corresponds to the identification information of the vehicle user. The sharing management information may include a pickup and delivery user name, and may include identification information of a pickup and delivery user terminal 60 to which key information has been issued and a completion time of a pickup and delivery operation when details reserved for use of the trunk sharing have been completed. In this embodiment, a pickup and delivery user can be set not to be limited by the sharing target range information illustrated in FIG. 5.

Figure 7:
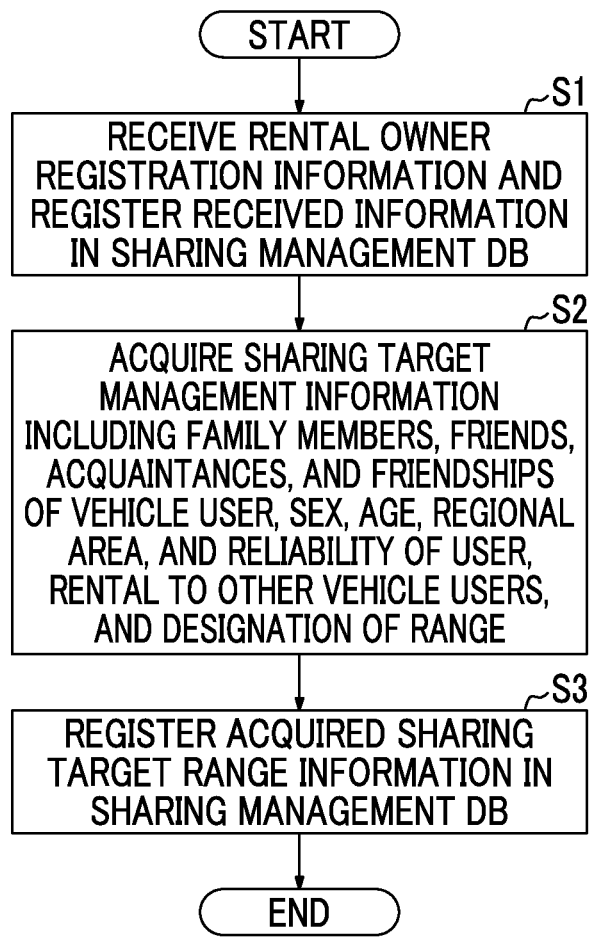
FIG. 7 is a flowchart illustrating an example of a process flow of registering rental owner registration information.

A process flow of granting an authority for trunk sharing to a user, which is provided by the sharing management server 10 according to this embodiment, will be described below. FIG. 7 is a flowchart illustrating an example of a process flow of registering rental owner registration information in the sharing management DB 200. The sharing management server 10 provides the process flows illustrated in FIGS. 7 to 11, for example, by causing the CPU 11 or the like to read and execute various programs or various data stored in the auxiliary storage device 13 and information stored in the sharing management DB 200. The process flows illustrated in FIGS. 7 and 8 are mainly provided by the information processing functions of the registration information processing unit 110 and the sharing target range information acquiring unit 120.

In the flowchart illustrated in FIG. 7, the process flow is started, for example, when rental owner registration information is input and received by operating an owner terminal 40. The owner terminal 40 receives the rental owner registration information input by a vehicle user's operation and transmits the received rental owner registration information to the sharing management server 10. The sharing management server 10 receives the rental owner registration information transmitted from the owner terminal 40. Then, the sharing management server 10 registers the received rental owner registration information in the sharing management DB 200 in correlation with identification information for uniquely identifying the vehicle user (S1). Then, the sharing management server 10 acquires sharing target range information for designating a range of users of trunk sharing of a vehicle 30 which is input by operating the owner terminal 40 (S2). The sharing target range information includes items which are designated by the vehicle user from information for specifying a family member, a friend, an acquaintance, and a friendship of the vehicle user, sex, age, regional area, and reliability of a user, other owners, and designation of range, as illustrated in FIG. 6. The sharing management server 10 registers the acquired sharing target range information in the sharing management DB 200 in correlation with identification information of the vehicle user (a vehicle owner ID) (S3). As an example of acquiring target range information in which a range of users who use a cargo compartment of a vehicle is designated, the sharing management server 10 may perform the processes of S1 to S3. In the sharing target range information in the sharing management DB 200, limitation of the range of users designated by the vehicle user is stored as a sub field of the field of user range designation classification. After S3 has been performed, the process flow illustrated in FIG. 7 ends.

When a usage ID for an SNS or the like which is used by the vehicle user is included as information for specifying a friendship, the sharing management server 10 accesses the corresponding SNS service site, for example, based on the usage ID. Then, the sharing management server 10 may specify the friendship of the vehicle user in the SNS service site via an API. Information of the friendship of the vehicle owner which is specified from the SNS or the like is imported into the sharing target range information.

Figure 8:
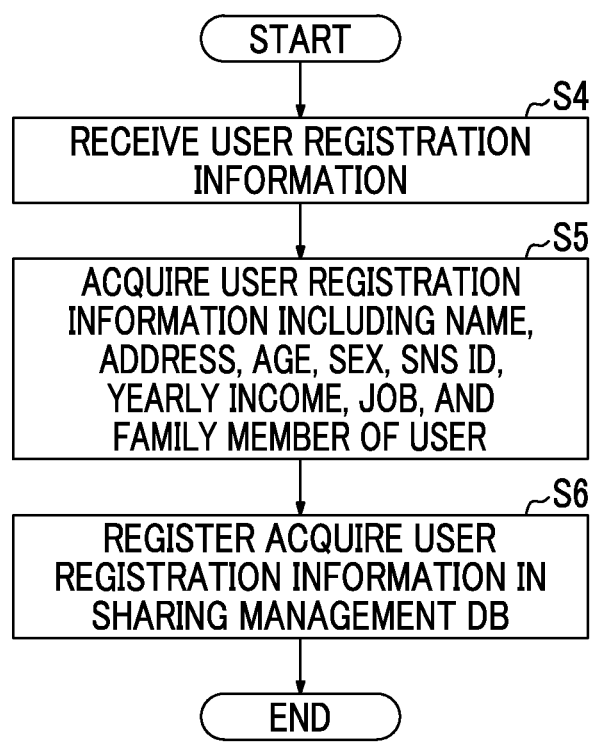
FIG. 8 is a flowchart illustrating an example of a process flow of registering user registration information.

FIG. 8 is a flowchart illustrating an example of a process flow of registering user registration information in the sharing management DB 200. In the flowchart illustrated in FIG. 8, the process flow is started, for example, when user registration information is received by operating a user terminal 50. The process flow in the flowchart illustrated in FIG. 8 may be started, for example, when a request for use of a trunk sharing service, that is, a request for rental of a trunk, is input in response to a user's operation of a user terminal 50. The sharing management server 10 receives user registration information input by the user's operation and transmitted from the user terminal 50 (S4). The sharing management server 10 acquires user registration information including information corresponding to the sharing target range information such as name, address, age, sex, SNS ID, yearly income, job, and family member of the user (S5). The sharing management server 10 registers the acquired user registration information in the sharing management DB 200 in correlation with identification information for uniquely identifying the user (S6). As an example of receiving attributes of a user who desires use of the cargo compartment of the vehicle, the sharing management server 10 may perform the processes of S4 to S6.

Figure 9:
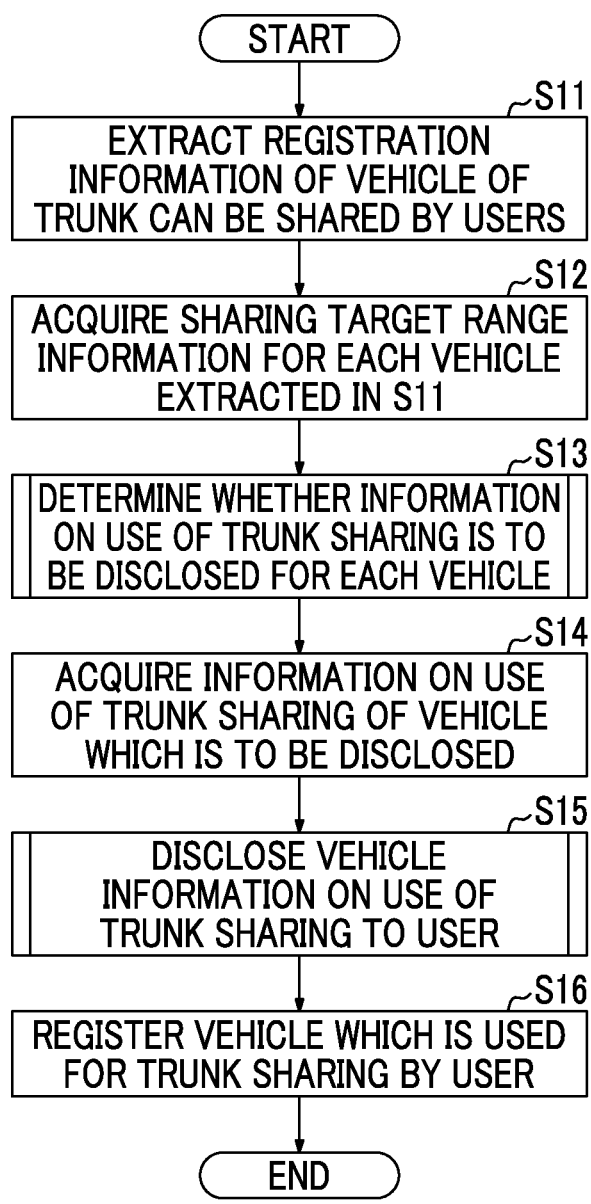
FIG. 9 is a flowchart illustrating an example of a process of flow of disclosing vehicle information to a user.

A process flow of disclosing vehicle information to a user which is performed by the sharing management server 10 will be described below. FIG. 9 is a flowchart illustrating an example of a process flow of disclosing vehicle information to a user which is performed when user information is registered. The process flow illustrated in FIG. 9 is mainly provided by the information processing functions of the vehicle information disclosure processing unit 130 and the sharing management processing unit 140.

In the flowchart illustrated in FIG. 9, the process flow is started, for example, when user information is registered. The sharing management server 10 extracts registration information of vehicles 30 which can be used for trunk sharing with reference to the sharing management DB 200 with registration of user information as a trigger (S11). The sharing management server 10 searches the rental owner registration information registered in the sharing management DB 200, for example, using an address of a user as a search key. The sharing management server 10 extracts rental owner registration information of vehicles 30 which are used for trunk sharing and in which an address of a parking lot of the vehicle 30 is close to a region (for example, municipalities) to which an address of the user belongs. This extraction condition is arbitrary and can be defined as a parameter in a program in advance. For example, the extraction condition may be a condition that a parking lot in which a vehicle 30 of which a trunk is shared is located within a predetermined distance from the address of the user. For example, rental owner registration information of vehicles 30 of which a parking lot is registered in a regional area within 3 km from the address of the user. When the distance is used as the extraction condition, a plurality of extraction conditions can be set depending on the magnitude of a distance. The sharing management server 10 temporarily stores the rental owner registration information extracted in the process of S11 in a predetermined area of the main storage device 12 in correlation with identification information of the user.

The sharing management server 10 acquires sharing target range information for each vehicle 30 extracted in the process of S11 (S12). In the sharing target range information, a range of users who use trunk sharing is designated. The sharing management server 10 acquires identification information of a vehicle user from the rental owner registration information extracted in the process of S11. Then, the sharing management server 10 searches the sharing target range information stored in the sharing management DB 200 using the acquired identification information of the vehicle user as a search key, and extracts the sharing target range information set for the corresponding vehicle 30. The sharing target range information extracted for each vehicle 30 is temporarily stored in a predetermined area of the main storage device 12 in correlation with identification information of a corresponding vehicle user.

The sharing management server 10 determines whether information on trunk sharing can be disclosed to a user for each corresponding vehicle 30 based on the sharing target range information extracted in the process of S12 (S13). Details of the process of S13 will be described later with reference to FIG. 10. As an example of determining whether use of a cargo compartment of a vehicle by a user is permitted, the sharing management server 10 may perform the process of S13. As the result of the process of S13, a vehicle 30 which satisfies conditions designated in the sharing target range information is specified from the vehicles 30 extracted in the process of S11. The sharing management server 10 introduces rental owner registration information of the vehicle 30 specified in the process of S13 into the process of S14. The sharing management server 10 repeatedly performs the process of S13 on all the vehicles 30 extracted in the process of S11 and specifies a vehicle 30 which can be used by a user as a processing target.

The sharing management server 10 acquires predetermined information on use of a trunk sharing service from the rental owner registration information of the vehicle 30 introduced from the process of S13 (S14). Here, the predetermined information includes at least information for specifying the vehicle 30 of which the trunk is shared (such as a vehicle manufacturer name, a vehicle model, a color or a vehicle image, and a number), parking position information (such as a parking lot address, a parking position or the like, and image information of the parking position), a usage type of the trunk sharing service, and limitation of luggage attributes. In a trunk sharing service in which a plurality of users can use a trunk of the same vehicle at the same time or in a period in which usage times overlap, the predetermined information may include the number of users who use the trunk sharing service in the overlapping usage period of the corresponding vehicle. The sharing management server 10 can search the sharing management information stored in the sharing management DB 200, for example, using the identification information of the vehicle 30 as a search key, acquire the number of users who use the trunk sharing service and who can be known at the current time point, and add the number of users in the predetermined information. The sharing management server 10 introduces the acquired predetermined information of the vehicle 30 associated with use of the trunk sharing service into the process of S15.

The sharing management server 10 discloses the predetermined information of the vehicle 30 introduced from the process of S14 to a user as a processing target (S15). Details of the process of S15 will be described later with reference to FIG. 11. As the result of the process of S15, a user who satisfies the conditions designated in the sharing target range information is notified of the predetermined information of the vehicle 30 of which the trunk can be shared.

The predetermined information which is notified to the user is displayed on a display device such as an LCD of the user terminal 50 as an e-mail, an SMS message, or contents in which the information is described in the HTML or the like via a support application. The user browses the predetermined information for each vehicle 30 displayed on the display device of the user terminal 50 and selects a vehicle 30 which is desired to be used for trunk sharing. The user effectively operates, for example, a radio button or the like added to the predetermined information and transmits an intention to use a trunk sharing service with the selected vehicle 30 to the sharing management server 10.

The sharing management server 10 registers the vehicle 30 which is used for trunk sharing by the user based on designation of the vehicle 30 for which a radio button has been effectively operated (S16). The sharing management server 10 receives designation of the vehicle 30 selected by the user and temporarily stores the received information of the vehicle 30 in a predetermined area of the main storage device 12 in correlation with the user. The sharing management server 10 specifies identification information of the vehicle 30 from the rental owner registration information corresponding to the information of the vehicle 30 designated by the user. The sharing management server 10 stores the specified identification information of the vehicle 30 in the user registration information registered in the sharing management DB 200. The sharing management server 10 updates the number of users who share the trunk and the identification information of the users which are stored in the sharing management information of the sharing management DB 200 based on the identification information of the vehicle 30.

When the information of the vehicle 30 is disclosed in a state in which a number and a vehicle image of the vehicle 30 are hidden in the process of S15, information including the color or the vehicle image, the number, a parking position or the like, and image information of the parking position of the designated vehicle 30 is disclosed to the user as a processing target in this processing step. The user can recognize the disclosed predetermined information of the vehicle 30 designated by the user via the display device of the user terminal 50. After the process of S16 has been performed, the process flow illustrated in FIG. 9 ends.

Figure 10:
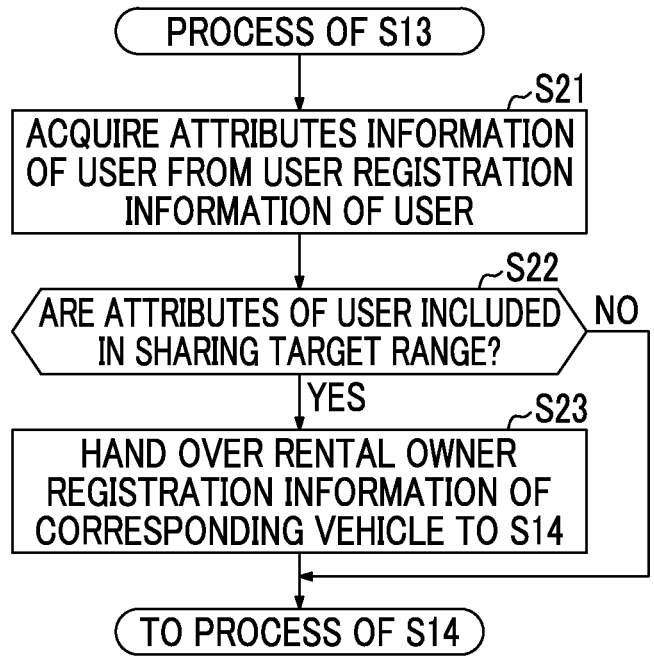
FIG. 10 is a flowchart illustrating an example of a detailed process of S13.

Details of the process of S13 will be described below. FIG. 10 is a flowchart illustrating an example of the details of the process of S13. In S21, the sharing management server 10 acquires information indicating attributes of a user from user registration information registered in the sharing management DB 200. Here, information indicating attributes of a user refers to information corresponding to sharing target range information designated for the corresponding vehicle 30. That is, the information indicating attributes of a user is information such as a name, an address, an age, a sex, an SNS ID, a yearly income, a job, and a family member of the user which are acquired through the process of S5 in FIG. 8. The sharing management server 10 temporarily stores the attribute information of the user acquired from the user registration information in a predetermined area of the main storage device 12 in correlation with the identification information of the user.

The sharing management server 10 compares the attribute information of the user acquired in the process of S21 with the sharing target range information and determines whether attributes of the user satisfy conditions designated in the sharing target range information. More specifically, the sharing management server 10 determines whether attributes of the user are included in the sharing target range (S22). For example, when the field of range designation in the sharing target range information is "NO," the sharing management server 10 determines that permission to a plurality of unspecified users is designated and attributes of the user are included in the sharing target range. On the other hand, when the field of range designation in the sharing target range information is "YES," the sharing management server 10 performs the determination based on other designation information and attributes of the user included in the sharing target range information.

When the sharing target range information designates a family member, a friend, an acquaintance of a vehicle owner and the name of the user corresponds to the designation, the sharing management server 10 determines that attributes of the user are included in the sharing target range. When the sharing target range information designates a friendship of a vehicle owner and an ID of an SNS which has been registered by a user is included in the information specifying the friendship acquired from the SNS or the like, the sharing management server 10 determines that attributes of the user are included in the sharing target range. When the sharing target range information designates the sex or age of a user and the sex or age of the trunk-sharing user corresponds thereto, the sharing management server 10 determines that attributes of the user are included in the sharing target range. When the sharing target range information designates a regional area in which a user who uses the trunk sharing service lives and an address of a user is included in the regional area, the sharing management server 10 determines that attributes of the user are included in the sharing target range. When the sharing target range information designates that a user who uses the trunk sharing service has a reliability equal to or greater than a predetermined reliability and an item for evaluating the relative reliability acquired from a user is evaluated to be equal to or greater than a predetermined reliability, the sharing management server 10 determines that attributes of the user are included in the sharing target range. When a user has paid a predetermined amount of margin in use of the trunk sharing service, the sharing management server 10 determines that attributes of the user are included in the sharing target range. When the sharing target range information designates that rental to other vehicle user is "permitted," the sharing management server 10 searches rental owner registration information based on a name of a user or the like. Then, when the user is registered in the rental owner registration information, the sharing management server 10 determines that attributes of the user are included in the sharing target range. When attributes of a user do not correspond to any case in which attributes of a user are included in the sharing target range, the sharing management server 10 determines that attributes of the user are not included in the sharing target range.

In the process of S22, when attribute information of a user is included in the extracted sharing target range ("YES" in S22), the sharing management server 10 determines that information on trunk sharing of the corresponding vehicle 30 can be disclosed and performs the process of S23. In the process of S23, the sharing management server 10 introduces the rental owner registration information of the vehicle 30 of which information on trunk sharing can be disclosed into the process of S4. On the other hand, when attribute information of a user is not included in the extracted sharing target range ("NO" in S22), the sharing management server 10 determines that the information on trunk sharing of the corresponding vehicle 30 cannot be disclosed and performs the process of S14. When attribute information of a user is not included in the extracted sharing target range, the process of S23 is skipped and thus information of the vehicle 30 is not disclosed.

Figure 11:
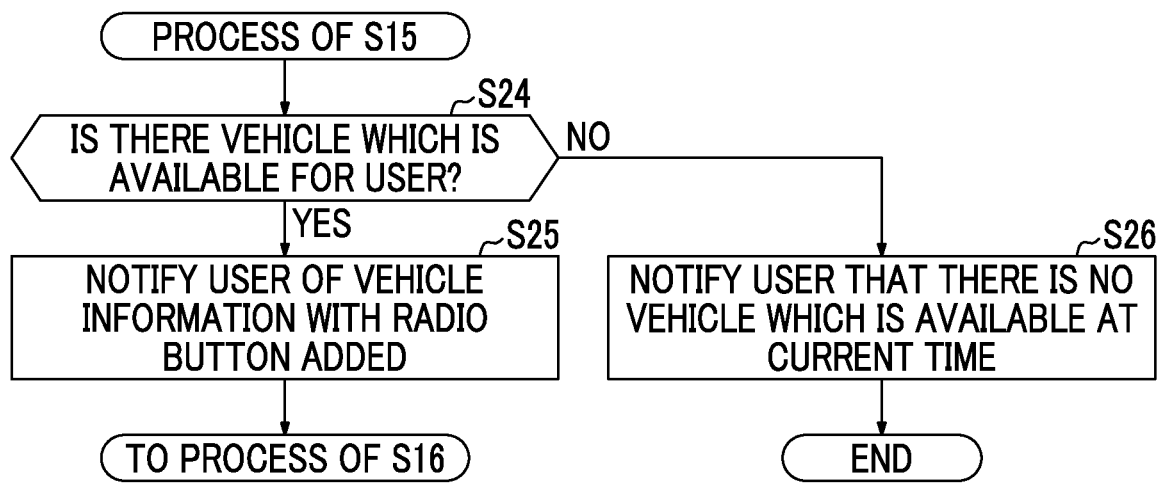
FIG. 11 is a flowchart illustrating an example of a detailed process of S15.

Details of the process of S15 will be described below. FIG. 11 is a flowchart illustrating an example of the details of the process of S15. In S24, the sharing management server 10 determines whether there is a vehicle which can be used by a user. When predetermined information of a vehicle 30 is included in the information introduced from the process of S14 ("YES" in S24), the sharing management server 10 determines that there is a vehicle 30 which can be used by a user and performs the process of S25. On the other hand, predetermined information of a vehicle 30 is not included in the information introduced from the process of S14 ("NO" in S24), the sharing management server 10 determines that there is no vehicle 30 which can be used by the user and performs the process of S26.

In the process of S25, the sharing management server 10 adds, for example, a radio button for checking an intention to use trunk sharing for each vehicle 30 and transmits the introduced predetermined information of the vehicle 30 to the user terminal 50 of the user. Here, the sharing management server 10 may additionally select information associated with disclosure of the predetermined information of the vehicle 30 introduced from the process of S14 and transmit the selected information to the user terminal 50. The sharing management server 10 may select and disclose, for example, a vehicle manufacturer name, a vehicle model, a parking lot address, a usage type of trunk sharing, limitation of luggage attributes, and the number of users who use trunk sharing. The sharing management server 10 can cover information associated with use of trunk sharing and disclosed to the user with the number and the vehicle image of the vehicle 30 and then can minimize information which is disclosed. After the process of S25 has been performed, the process flow transitions to the process of S16.

In the process of S26, the sharing management server 10 notifies the user terminal 50 of the user that there is no vehicle 30 which can be used at the current time point. For example, the sharing management server 10 transmits a predetermined message indicating that "there is no vehicle which can be used as a delivery destination of a delivery object or a pickup place of luggage" to the user terminal 50. When predetermined information of a vehicle 30 is not included in the information introduced from the process of S14, the process flow illustrated in FIG. 9 ends after the process of S26 has been performed.

When a request for change of a vehicle 30 of which the trunk is shared has been notified from a user after the vehicle 30 associated with use of the trunk sharing has been registered, the sharing management server 10 performs the process flow illustrated in FIG. 9 with reception of the request for change as a trigger. The sharing management server 10 repeatedly performs the process flow illustrated in FIG. 9, for example, in a state in which the non-changed vehicle 30 has been excluded from the processing target. For example, when there is no vehicle 30 which can be used in trunk sharing for a user having transmitted the request for change, the sharing management server 10 may add a radio button to a predetermined message indicating that "there is no vehicle which can be used as a delivery destination of a delivery object or a pickup place of luggage currently. Will you continue to use the non-changed vehicle?" and transmit the resultant message to the user terminal 50.

Before a usage period of trunk sharing registered in the user registration information in the sharing management DB 200 has expired, the sharing management server 10 may add a radio button to a predetermined message indicating that "Expiration of the usage period of the vehicle is impending. Will you continue to use the vehicle which is currently used as a delivery destination of a delivery object or a pickup place of luggage currently?" and transmit the resultant message to the user terminal 50. In this case, when change of the vehicle 30 which is used in trunk sharing is requested, the sharing management server 10 repeatedly performs the process flow illustrated in FIG. 9 in a state in which the non-changed vehicle 30 is excluded from the processing target.

The sharing management server 10 may perform the process flow illustrated in FIG. 9 periodically or with update of the sharing target range information as a trigger. In this case, the sharing management server 10 performs the process flow illustrated in FIG. 9 on all users of which user registration information has been stored in the sharing management DB 200. The sharing management server 10 can notify a user of information of a vehicle 30 which can be used in trunk sharing and which is re-determined based on newest sharing target range information and user registration information by performing the process flow illustrated in FIG. 9 periodically or with update of the sharing target range information as a trigger. A user who uses trunk sharing can change a target vehicle which is already used based on new information of a vehicle 30 transmitted based on the updated sharing target range information. For example, the vehicle can be updated to a target vehicle which is rented in a parking lot close to a dwelling address of the user. Alternatively, the vehicle can be updated to a target vehicle based on a usage type or limitation of luggage attributes desired by the user or parking lot environments of the vehicle 30 (such as being outdoor, being roofed, or a simple path to a parking lot). The information processing function of the sharing management server 10 described above with reference to FIGS. 7 to 11 may be provided to a user who uses trunk sharing by the key information management server 20 in which a sharing management function according to this embodiment is provided.

Figure 12:
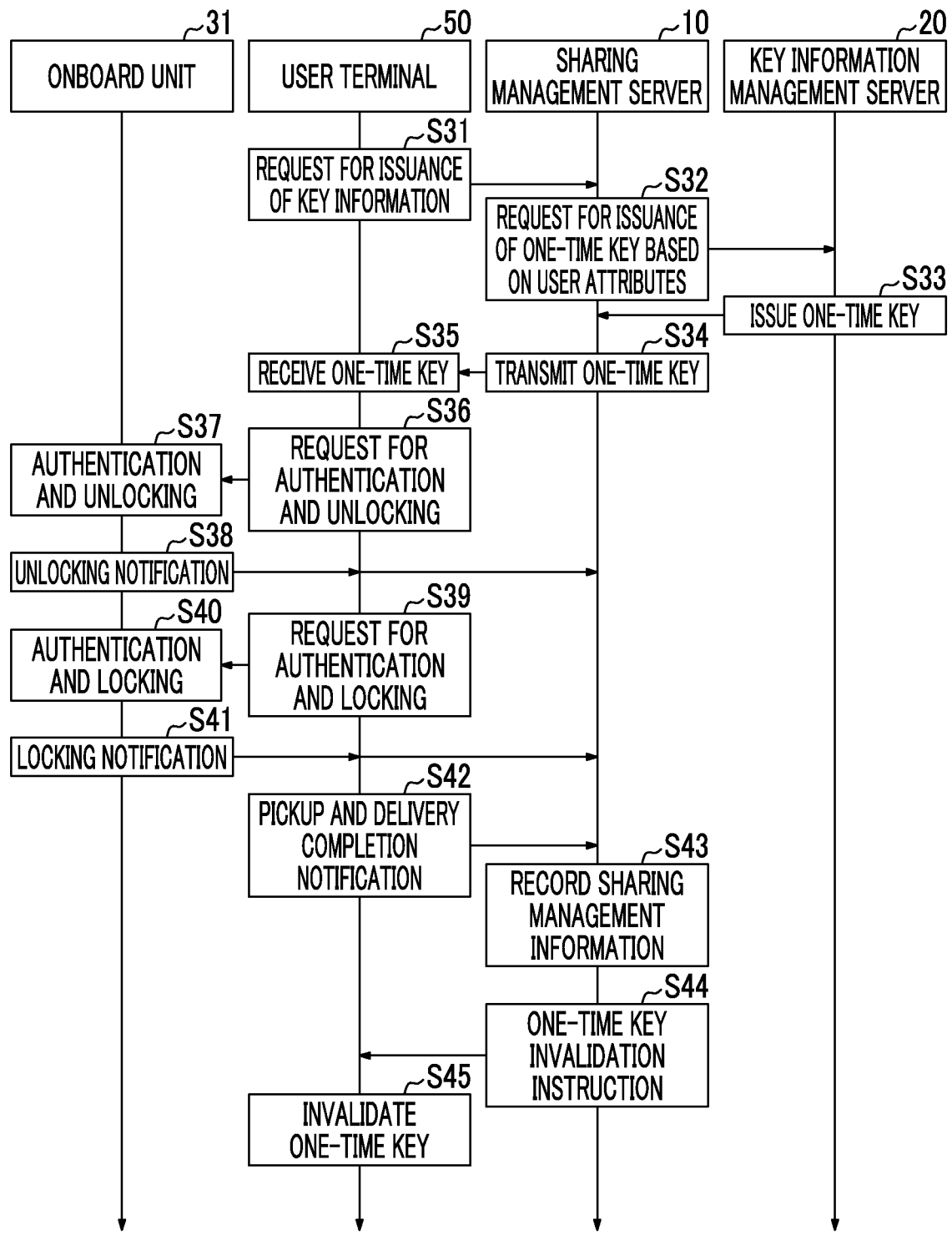
FIG. 12 is a sequence diagram illustrating an example of a process flow of issuing a key for a trunk sharing system.

A process flow of a key issuing process in the trunk sharing system 1 will be described below. FIG. 12 is a sequence diagram illustrating an example of a flow of a key issuing process which is performed by the trunk sharing system 1. In FIG. 12, it is assumed that at least rental owner information of vehicle users, user information of users, and sharing target range information has been completely registered in the sharing management server 10 and a schedule associated with use of trunk sharing of a user has been reserved in sharing management information. It is also assumed that a support application is installed in the user terminal 50 or the like. In FIG. 12, the key information management server 20 having received a request for issuance of key information from the sharing management server 10 issues key information. Here, regarding issuance of key information, the sharing management server 10 may have the processing function of the key information management server 20 and may issue key information to the user terminal 50 or the like.

It is assumed that a user in FIG. 12 accesses, for example, an external server 70A that provides an online shopping site, purchases a product (a delivery object), and uses trunk sharing of a vehicle 30 as a delivery destination of the purchased product. For example, the user accesses the sharing management server 10 via the support application of the user terminal 50 and browses sharing management information of vehicles 30 stored in the sharing management DB 200. Then, the user selects candidates of a date and time and a time period in which a vehicle can be shared as a delivery destination of a delivery object, for example, from usage statuses of trunk sharing of vehicles 30. The selected date and time and the selected time period are registered in the external server 70A providing the online shopping site as a delivery destination, a desired delivery date, and a desired delivery time period of a purchased product via the user terminal 50. The external server 70A transmits information such as the registered delivery destination, desired delivery date, desired delivery time period of the purchased product to an external server 70B operated by a pickup and delivery service provider connected to the network N in correlation with information for specifying a user. In the external server 70B, information on the delivery object transmitted from the external server 70A is registered, for example, in pickup and delivery management information (such as a pickup and delivery schedule) of a delivery object managed by the external server 70B. The external server 70B transmits a notification indicating that delivery of a delivery object (a purchased product) has been accepted to the user, for example, based on a phone number or an e-mail address of the user terminal 50 included in the information for specifying a user. The user having received the notification from the pickup and delivery service provider registers the date, the time period, the object attributes, and the like selected for use of trunk sharing in the sharing management server 10, for example, through execution of the support application. The sharing management server 10 registers the date, the time period, and the object attribute of the delivery object, the usage type (a delivery destination), and the identification information of the user in the sharing management information of the vehicle 30 which is used in trunk sharing.

Here, the sharing management server 10, the external server 70A that provides an online shopping site, and the external server 70B that is operated by a pickup and delivery service provider may provide the process flow in cooperation with each other. For example, when a user designates a vehicle 30 as a delivery destination of a purchased product in an online shopping site, the external server 70A accesses the sharing management server 10 and requests the sharing management server 10 to search for specification of user information of the user and an available schedule of the vehicle 30 of which the trunk is shared by the user. Then, the external server 70A may select a plurality of sets of a scheduled delivery date and a scheduled delivery time period of the purchased product based on the available schedule searched for by the sharing management server 10 and transmit the selected schedule information to the external server 70B. The external server 70B adjusts a pickup and delivery period, for example, based on the schedule information of the purchased product transmitted from the external server 70A and a pickup and delivery schedule which is managed by the external server 70A, determines a delivery date and a delivery time period of the purchased product, and registers the determined delivery date and the determined delivery time period in the pickup and delivery schedule which is managed by the external server 70B. The external server 70B notifies the external server 70A of the delivery date and the delivery time period of the purchased product. The external server 70A notifies the sharing management server 10 and the user terminal 50 of the delivery date and the delivery time period of the notified purchased product along with a name of the pickup and delivery service provider (a pickup and delivery user name) or the like. The sharing management server 10 may register information such as the delivery date, the delivery time period, and the pickup and delivery service provider of the purchased product notified from the external server 70A in the sharing management information of the sharing management DB 200.

A user transmits a request for issuance of key information for unlocking and locking a cargo compartment or the like of a vehicle 30 to the sharing management server 10 via a support application mounted in the user terminal 50 (S31). The request for issuance of key information transmitted from the user terminal 50 to the sharing management server 10 includes information for specifying the vehicle 30 in which the delivery object is stored, information for specifying the user, and an identification number of a completion notification notified to the user terminal 50.

The sharing management server 10 receives the request for issuance of key information from the user terminal 50 and requests the key information management server 20 to issue a one-time key. The sharing management server 10 specifies attributes of the user based on the information for specifying the user included in the request for issuance of key information from the user terminal 50. Then, the sharing management server 10 requests the key information management server 20 to issue a one-time key corresponding to attributes of the user (S32). For example, when the user is a family member of a vehicle user, issuance of key information in which a usage place of an electronic key is not limited can be requested. When the user is a friend, an acquaintance, or the like of the vehicle user, issuance of key information in which a usage place of trunk sharing is an area other than the cargo compartment, for example, a rear seat, can be requested. The usage place of trunk sharing can be limited to the cargo compartment for a user other than the above-mentioned users. The sharing management server 10 transmits a request for issuance of a one-time key including identification information of the vehicle 30 to the key information management server 20, for example, along with information for specifying the usage place of key information. The sharing management server 10 may acquire, for example, information of a usage time period (including a usage date) stored in the sharing management information and add the usage time period information to the request for issuance of a one-time key. The sharing management server 10 may add identification information of a user who has designated the vehicle 30 as a delivery destination to the request for issuance of a one-time key.

The key information management server 20 receives the request for issuance of a one-time key transmitted from the sharing management server 10 and issues key information (S33). The key information management server 20 issues key information for allowing the user terminal 50 to serve as a temporary electronic key based on at least vehicle identification information of the vehicle 30 included in the request for issuance of a one-time key and time information at which the request for issuance is received. When the usage time period information is included in the request for issuance of key information, the key information management server 20 may set a validity period based on the usage time period information in the key information. When the request for issuance of key information includes information for specifying a usage place, the key information management server 20 may issue key information for allowing driving of the vehicle 30 or key information for allowing opening and closing a rear gate of the vehicle. This issuance of key information corresponding to the usage place can be set in advance in cooperation with the sharing management server 10. A family member of a vehicle user can drive the vehicle 30 to transport a delivery object to a home distant from a parking lot, such that convenience is improved. The key information management server 20 can provide issuance of key information corresponding to designation of the sharing target range. As an example of issuing key information of an electronic key for temporarily unlocking or locking the vehicle to the user who desire use of the cargo compartment of the vehicle based on the target range information, the sharing management server 10 and the key information management server 20 of the trunk sharing system 1 may perform the processes of S32 to S33.

When the key information management server 20 transmits the issued key information as a one-time key to the sharing management server 10, the sharing management server 10 transmits the one-time key transmitted from the key information management server 20 to the user terminal 50 (S34). The user terminal 50 receives the one-time key transmitted from the sharing management server 10 and temporarily stores the one-time key in a predetermined area of the main storage device 52 (S35). The one-time key may be directly issued from the key information management server 20 to the user terminal 50.

The sharing management server 10 may request the key information management server 20 to issue a one-time key, for example, when reception of a delivery completion notification from a pickup and delivery user terminal 60 or the external server 70B as a trigger. In this case, the process of S31 may be skipped.

The user executes the support application, allows the user terminal 50 having received the key information to serve as a temporary electronic key for locking and unlocking the cargo compartment or the like of the vehicle 30 in which the delivery object is stored, and transmits an unlocking request (S36). When the user is a family member designated in the sharing target range information, for example, the user terminal 50 having received the key information serves as an electronic key of which the usage place for locking and unlocking is not limited to the cargo compartment or the like and which allows driving of the vehicle 30.

The key unit 80 of the onboard unit 31 mounted in a vehicle 30 performs authentication based on an unlocking request from the user terminal 50, and transmits a locking/unlocking signal and a key ID to the locking/unlocking device 90 when the authentication has succeeded. The locking/unlocking device 90 performs an unlocking process based on the locking/unlocking signal and the key ID transmitted from the key unit 80, and the cargo compartment or the like of the vehicle 30 is unlocked (S37). The user terminal 50 and the sharing management server 10 are notified of an unlocking notification from the onboard unit 31 (S38). In the sharing management server 10, time information at which the unlocking notification has been received is recorded in the sharing management information of the vehicle 30.

The user takes out a delivery object stored in the cargo compartment or the like of the unlocked vehicle 30 and locks the cargo compartment or the like (S39). In locking the cargo compartment, the same processes as the processes described in S37 and S38 are performed (S40 and S41). The user transmits a pickup and delivery completion notification to the sharing management server 10, for example, via the user terminal 50 (S42). In the sharing management server 10, for example, time information at which the pickup and delivery completion notification has been received is recorded in the sharing management information of the vehicle 30, and "completed" is recorded in the usage completion/incompletion status corresponding to the corresponding usage period (S43).

The sharing management server 10 invalidates the one-time key stored in the user terminal 50 (S44). The sharing management server 10 instructs the user terminal 50 to delete the key information stored therein, for example, with recording of the pickup and delivery completion notification in the sharing management information as a trigger. In the user terminal 50, key information of the one-time key which is temporarily stored in the predetermined area of the main storage device 52 is deleted, for example, through execution of the support application which has been instructed to delete the key information (S45). In the user terminal 50, key information of the one-time key which is temporarily stored in the predetermined area of the main storage device 52 may be deleted through execution of the support application with the pickup and delivery completion notification as a trigger.

When a vehicle 30 is designated as a pickup place of a pickup object, the sequence diagram illustrated in FIG. 12 is applied. A user accesses the sharing management server 10, for example, via the support application of a user terminal 50 and browses the sharing management information of a vehicle 30 stored in the sharing management DB 200. Then, the user selects a plurality of candidates for a date and a time period in which the trunk of the vehicle 30 can be shared as a pickup place of a pickup object, for example, according to the usage status of trunk sharing of the vehicle 30. The user registers the plurality of selected candidates as a desired pickup date and a desired pickup time period in the external server 70B of a pickup and delivery service provider that provides a pickup and delivery service along with the pickup place of a pickup object and information for specifying the user, for example, via the user terminal 50. The external server 70B transmits a notification indicating that pickup of a pickup object has been accepted to the user based on a phone number, an e-mail address, or the like of the user terminal 50 included in the information for specifying the user. The user having received the notification from the pickup and delivery user registers the date and the time period selected for the pickup place of a pickup object, object attributes of the pickup object, and the like in the sharing management server 10 via the support application. The sharing management server 10 registers the usage date, the time period, the object attributes, the usage type (the pickup place), and the identification information of the user in the sharing management information of the vehicle 30 which is used for trunk sharing.

Here, the sharing management server 10 and the external server 70B that is operated by the pickup and delivery service provider may provide the process flow in cooperation with each other. For example, when a user having accessed the external server 70B designates a vehicle 30 as a pickup place of a pickup object, the external server 70B accesses the sharing management server 10 and requests the sharing management server 10 to specify user information of the user and to search for an available schedule of the vehicle 30 of which the trunk is to be shared by the user. Then, the external server 70B may adjust a pickup and delivery period including such as the available schedule searched by the sharing management server 10 and a pickup and delivery schedule which is managed by the external server 70B itself, determine a pickup date and a pickup time period of a pickup object of the user, and register the determined pickup date and the determined pickup time period in the pickup and delivery schedule. The external server 70B notifies the sharing management server 10 and the user terminal 50 of the pickup date and the pickup time period determined for the user along with a pickup and delivery service provider name (a pickup and delivery user name) or the like. The sharing management server 10 may register information on the pickup date, the pickup time period, the pickup and delivery service provider, and the user of the pickup object notified from the external server 70B in the sharing management information of the sharing management DB 200.

The user moves to a parking lot of the vehicle 30 designated as a pickup place and stores a pickup object in the cargo compartment or the like. The user notifies the sharing management server 10 of a request for issuance of key information for unlocking and locking the cargo compartment or the like of the vehicle 30 via the support application mounted in the user terminal 50 (S31). The request for issuance of key information from the user terminal 50 includes at least information for specifying the vehicle 30 and information for specifying the user.

The sharing management server 10 receives the request for issuance of key information from the user terminal 50 and requests the key information management server 20 to issue a one-time key. The sharing management server 10 specifies attributes of the user, for example, based on the information for specifying the user, which is included in the request for issuance of key information. Then, the sharing management server 10 requests the key information management server 20 to issue a one-time key corresponding to the attributes of the user (S32). When the user is a family member of the vehicle user, issuance of key information in which the usage place of an electronic key is not limited may be requested. When the user is a friend, an acquaintance, or the like of the vehicle user, issuance of key information in which a usage place of trunk sharing is an area other than the cargo compartment, for example, a rear seat, may be requested.

The key information management server 20 receives the request for issuance of a one-time key transmitted from the sharing management server 10 and issues key information (S33). The key information management server 20 issues key information for allowing the user terminal 50 to serve as a temporary electronic key based on at least vehicle identification information of the vehicle 30 included in the request for issuance of a one-time key and time information at which the request for issuance is received. When the usage time period information is included in the request for issuance of key information, the key information management server 20 may set a validity period based on the usage time period information in the key information. When the request for issuance of key information includes information for specifying a usage place, the key information management server 20 may issue key information for allowing driving of the vehicle 30 or key information for allowing opening and closing a rear gate of the vehicle. This issuance of key information corresponding to the usage place can be set in advance in cooperation with the sharing management server 10. When storing luggage in the vehicle 30 at night, the ignition switch may be turned ON or switched to the ACC state, and lighting can be secured by turning on the headlights of the vehicle 30, such that convenience is improved. The key information management server 20 can provide issuance of key information corresponding to designation of the sharing target range.

When the key information management server 20 transmits the issued key information as a one-time key to the sharing management server 10 at the time of pickup, the sharing management server 10 transmits the one-time key transmitted from the key information management server 20 to the user terminal 50. In the user terminal 50, the received one-time key is temporarily stored in the main storage device 62 or the like (S34 and S35). When the user executes the support application, causes the user terminal 50 having received the key information to serve as a temporary electronic key for locking and unlocking the cargo compartment or the like of the vehicle 30, and transmits an unlocking request, the onboard unit 31 performs authentication based on the unlocking request. When the authentication has succeeded, the cargo compartment or the like of the vehicle 30 is unlocked (S36 and S37). Here, when attributes of the user indicate a family member designated in the sharing target range information, the locking/unlocking place of the user terminal 50 serving as an electronic key is not limited to the cargo compartment or the like.

When the onboard unit 31 transmits an unlocking notification to the user terminal 50 and the sharing management server 10 (S46), time information at which the unlocking notification has been received is recorded in the sharing management information of the vehicle 30 in the sharing management server 10. When the user stores a pickup object in the unlocked cargo compartment or the like of the vehicle 30 and locks the cargo compartment, the same processes as the processes described in S37 and S38 are performed (S40 and S41). The user terminal 50 receives an operation input from the user after a locking notification has been transmitted, and notifies the sharing management server 10 that storage of a pickup object in the vehicle 30 has been completed (S42). In the sharing management server 10, the time information at which a pickup and delivery completion notification has been received is recorded in the sharing management information of the vehicle 30 (S43).

The sharing management server 10 invalidates the one-time key stored in the user terminal 50 (S44). The sharing management server 10 instructs the user terminal 50 to delete the key information stored therein, for example, with recording of the pickup and delivery completion notification in the sharing management information as a trigger. In the user terminal 50, the key information of the one-time key which is temporarily stored in the predetermined area of the main storage device 52 is deleted, for example, through execution of the support application having received instruction of deleting the key information (S45). In the user terminal 50, the key information of the one-time key which is temporarily stored in the predetermined area of the main storage device 52 may be deleted by execution of the support application with the pickup and delivery completion notification as a trigger.

The sharing management server 10 may measure the usage time period, the usage frequency, and the like based on the received unlocking notification and the received locking notification, and reflect the measured information in a reward. The sharing management server 10 can request a reward corresponding to the usage period based on the unlocking notification and the locking notification of the vehicle.

As described above, the sharing management server 10 according to this embodiment can determine whether a received request for use is to be permitted based on the sharing target range information acquired from a vehicle user. The sharing management server 10 can limit or select users of a vehicle which is used in trunk sharing. For example, when attributes of a user are included in the sharing target range, the sharing management server 10 discloses information of the vehicle 30 which is used in trunk sharing. On the other hand, for example, when attributes of a user are not included in the sharing target range, the sharing management server 10 does not disclose information of the vehicle 30 which is used in trunk sharing. As a result, with the sharing management server 10 according to this embodiment, it is possible to limit an authority to access vehicle information of a vehicle which is shared by a plurality of users based on attributes of a user designated by a provider of the vehicle. With the sharing management server 10 according to this embodiment, it is possible to limit an authority to access vehicle information of a vehicle which is rented to a plurality of users. The sharing management server 10 discloses vehicle information of a vehicle which is shared to a user who satisfies the sharing target range information designated by a provider of the vehicle and issues key information of an electronic key for temporarily unlocking or locking the cargo compartment of the vehicle. A user who satisfies the sharing target range information can pick up and deliver a delivery object in the cargo compartment, for example, by causing a mobile terminal carried by the user to serve as an electronic key which is used to unlock and lock of the cargo compartment of the vehicle using the issued key information. As a result, with the trunk sharing system 1 including the sharing management server 10 according to this embodiment, it is possible to provide a technique of renting a trunk of a vehicle to limited users or allowing a plurality of users to share a trunk of a vehicle.

The sharing management server 10 can select users of a vehicle which is used in trunk sharing based on the sharing target range information including at least one of designation of a family member of a provider of the vehicle, designation of a friend of the provider of the vehicle, designation of an acquaintance close to a dwelling address of the provider of the vehicle, and designation of other provider who provides a cargo compartment of a vehicle for sharing by a plurality of users. With the trunk sharing system according to this embodiment, it is possible to limit users who share a cargo compartment of a vehicle to a user interested in a vehicle provider or an experienced user of provision of a vehicle.

The sharing management server 10 can select users of a vehicle which is used in trunk sharing based on the sharing target range information including at least one of sex designation of the users, age designation of the users, regional area designation in which the users live, and relatively reliability designation of the users. With the trunk sharing system according to this embodiment, it is possible to limit users who share a cargo compartment of a vehicle depending on attributes of the users. For example, in use of the cargo compartment, it is possible to select users who are expected to take consideration of other users, an available time period, and the vehicle.

The sharing management server 10 can select users of a vehicle which is used in trunk sharing based on the sharing target range information further including non-designation of a range of users who share the cargo compartment. With the trunk sharing system according to this embodiment, it is possible to cope with a request from a vehicle provider who wants a cargo compartment of a vehicle to be opened to a plurality of unspecified users without limiting the range of users.

In the trunk sharing system according to this embodiment, regarding key information, the usage place of an electronic key can be limited to allow driving of the vehicle 30 or to open and close only the cargo compartment based on the sharing target range information. For example, a family member of a vehicle user can drive the vehicle 30 to transport a delivery object to a home distant from a parking lot, and thus it is possible to improve convenience. For example, when storing luggage in the vehicle 30 at night, the ignition switch may be turned ON or switched to the ACC state, and lighting can be secured by turning on the headlights of the vehicle 30, such that convenience is improved.

The above-mentioned embodiment is only an example and the disclosure can be appropriately modified without departing from the gist thereof. In the embodiment, when an authentication process in the key unit 80 has succeeded, a vehicle 30 is locked or unlocked by the locking/unlocking device 90. In Modified Example 1, the locking/unlocking device 90 may perform the processes in the key unit 80. That is, the locking/unlocking device 90 may include a control unit (ECU) for authenticating authentication information received from a user terminal 50 or the like, and the control unit may transmit an unlocking command or a locking command to the body ECU 94 via an onboard network such as a CAN when authentication of the user terminal 50 or the like has succeeded. With the trunk sharing system 1 according to Modified Example 1, it is possible to use trunk sharing with a simple configuration without installing the key unit 80.

In the embodiment, a user terminal 50 or the like receives key information issued by the key information management server 20, a locking/unlocking signal is transmitted from the key unit 80 to the locking/unlocking device 90 when the user terminal 50 or the like has been authenticated based on authentication information of the received key information, and the vehicle 30 is locked or unlocked. In Modified Example 2, the authentication information includes information of a key ID for locking/unlocking the vehicle 30, not information for authenticating the user terminal 50 or the like.

In this case, the user terminal 50 or the like receives key information including a key ID for locking/unlocking the vehicle 30 from the key information management server 20, and transmits the received key ID along with a locking/unlocking signal to the locking/unlocking device 90. The locking/unlocking device 90 compares the received key ID with a key ID stored in advance in the locking/unlocking device 90 and locks and unlocks the vehicle 30 when the two key IDs coincide with each other. The key ID is transmitted and received in an encrypted state between the user terminal 50 or the like and the key information management server 20 or the locking/unlocking device 90. The key information management server 20 may generate a one-time key, for example, by encrypting the key ID using a predetermined algorithm along with time information. The locking/unlocking device 90 can decrypt the received one-time key using the same algorithm as in the key information management server 20 and compare the decrypted one-time key with the key ID stored in advance in the locking/unlocking device 90. The one-time key may be transmitted from the key information management server 20 to the sharing management server 10 and then may be transmitted from the sharing management server 10 to the user terminal 50 or the like. In any case, the user terminal 50 or the like can invalidate the one-time key by deleting the one-time key when a predetermined time has passed from reception of the one-time key. With the trunk sharing system 1 according to Modified Example 2, the key information management server 20 or the like can transmit key information which is temporarily valid to the user terminal 50 or the like for each request for issuance by using the one-time key generated based on the key ID and the time information as key information.

In the embodiment and Modified Example 2, the key information management server 20 transmits authentication information for a user terminal 50 or the like corresponding to fixed authentication information specific to the key unit 80 or a key ID stored in advance in the locking/unlocking device 90 of the vehicle 30. However, authentication information transmitted between the user terminal 50 or the like and the key unit 80 is not limited thereto. In Modified Example 3, for example, the key information management server 20 may generate new authentication information and issue the new authentication information to the user terminal 50 or the like when a request for issuance of key information is received from the user terminal 50 or the like. In this case, the key information management server 20 can transmit vehicle-side authentication information for the key unit 80 corresponding to the new authentication information to the key unit 80 via communication unit 32 and store the vehicle-side authentication information therein. The key unit 80 is connected to the communication unit 32 via an onboard network such as a CAN. Here, the key information management server 20 may generate authentication information which is transmitted to the user terminal 50 or the like, for example, based on identification information for identifying the vehicle 30 and time information and then transmit the authentication information and the time information to the user terminal 50 or the like. In this case, the key unit 80 of the vehicle 30 can generate vehicle-side authentication information using the same algorithm as in the key information management server 20. The user terminal 50 or the like can transmit the authentication information issued as key information and the time information to the key unit 80 and be subjected to authentication.

In the trunk sharing system 1 according to the embodiment and the modified examples, it is assumed that only a cargo compartment door of a vehicle 30 may be subjected to unlocking and locking control in consideration of security, a passenger compartment door is not subjected to unlocking and locking control and a locked state thereof is kept. Then, for example, in a vehicle 30 having a body structure in which a cargo compartment and a passenger compartment are not partitioned from each other, for example, a vehicle which is called one box type, since a user can access the passenger compartment by unlocking the cargo compartment door, there is a likelihood that an owner, a user, or the like of the vehicle 30 will have concern about security.

Therefore, in such a vehicle 30 in which the cargo compartment and the passenger compartment are not partitioned, a drive recorder or the like that can image the interior space can capture a moving image of the interior space when the cargo compartment door is opened and it can be determined whether a user invades into the passenger compartment from the cargo compartment based on the captured moving image. For example, when it is determined that a user has invaded into the passenger compartment from the cargo compartment, an ECU controlling the drive recorder performs storage of the captured moving image, operation of an onboard alarm, notification to the pickup and delivery service provider, notification to the vehicle user, and the like. On the other hand, when it is determined that a user has not invaded into the passenger compartment from the cargo compartment, the ECU may delete the captured moving image at a time point at which closing and locking of the cargo compartment door has been performed. The drive recorder may transmit the captured moving image to the owner terminal 40 or the like regardless of whether a user has invaded into the passenger compartment as a part of a user service. The range which is used in trunk sharing may be divided, for example, depending on the reliability acquired as the sharing target range information. For example, a moving image of the interior space when the cargo compartment door is opened may not be captured for a user who has a reliability equal to or higher than an evaluation value, and a moving image of the interior space when the cargo compartment door is opened may be captured for a user who has a reliability lower than the evaluation value, A program causing an information processing device or other machines or devices (hereinafter referred to as a computer or the like) to execute one of the above-mentioned functions can be recorded on a recording medium which can be read by the computer or the like. By causing the computer or the like to read and execute the program on the recording medium, the function can be provided.

Here, the recording medium which can be read by the computer or the like refers to a recording medium which can store information such as data or programs by an electrical, magnetic, optical, mechanical, or chemical action and be read by the computer or the like. Examples of the recording medium which can be detached from the computer or the like include a flexible disk, a magneto-optical disk, a CD-ROM, a CD-R/W, a DVD, a Blu-ray disc, a DAT, a 8 mm tape, and a memory card such as a flash memory. Examples of the recording medium which is fixed to the computer or the like include a hard disk and a ROM.

What is claimed is:

1. An information system that manages use of a cargo compartment of a vehicle by a plurality of users, the information system comprising a server configured to:
    acquire, from a provider of the vehicle, target range information regarding designation of a range of users who use the cargo compartment of the vehicle, the target range information including relationship designation information between the provider of the vehicle and the range of users, personal information of the range of users, and designation of permission of a plurality of unspecified users of the range of users;
    receive user registration information including attributes of a user who desires use of the cargo compartment of the vehicle, the user registration information including information corresponding to the target range information;
    determine, based on the target range information and the user registration information, whether the use of the cargo compartment of the vehicle by the user is permitted or not, the use of the cargo compartment of the vehicle by the user being permitted when the attributes of the user who desires use of the cargo compartment of the vehicle are included in the target range information;
    issue, based on the target range information, key information of an electronic key for temporarily unlocking and locking the vehicle to the user who desires use of the cargo compartment of the vehicle, and
    limit, based on the target range information, a usage place of the electronic key.

2. The information system according to claim 1, wherein the server is configured to grant, based on the target range information, an authority to access vehicle information for specifying the vehicle to a user who desires use of the cargo compartment of the vehicle.

3. The information system according to claim 1, wherein the relationship designation information includes family member designation information for designating a family member of a provider of the vehicle in the range of users or friend designation information for designating a friend of a provider of the vehicle in the range of users, and the personal information includes designation based on at least one category of: sex of the users; age of the users; a regional area in which the users live; and relative reliabilities of the users.

4. An information processing method for an information system that manages use of a cargo compartment of a vehicle by a plurality of users, the information system including a computer, the information processing method comprising:
    causing the computer to acquire, from a provider of the vehicle, target range information regarding designation of a range of users who use the cargo compartment of the vehicle, the target range information including relationship designation information between the provider of the vehicle and the range of users, personal information of the range of users, and designation of permission of a plurality of unspecified users of the range of users;
    causing the computer to receive user registration information including attributes of a user who desires use of the cargo compartment of the vehicle, the user registration information including information corresponding to the target range information;
    causing the computer to determine, based on the target range information and the user registration information, whether the use of the cargo compartment of the vehicle by the user is permitted or not, the use of the cargo compartment of the vehicle by the user being permitted when the attributes of the user who desires use of the cargo compartment of the vehicle are included in the target range information;
    causing the computer to issue, based on the target range information, key information of an electronic key for temporarily unlocking and locking the vehicle to the user who desires use of the cargo compartment of the vehicle; and
    causing the computer to limit, based on the target range information, a usage place of the electronic key.

5. The information processing method according to claim 4, further comprising causing the computer to grant, based on the target range information, an authority to access vehicle information for specifying the vehicle to a user who desires use of the cargo compartment of the vehicle.

6. The information processing method according to claim 4, wherein the relationship designation information includes family member designation information for designating a family member of a provider of the vehicle in the range of users or friend designation information for designating a friend of a provider of the vehicle in the range of users, and the personal information includes designation based on at least one category of: sex of the users; age of the users; a regional area in which the users live; and relative reliabilities of the users.

7. A non-transitory recording medium having a program stored therein, the program causing a computer of an information system that manages use of a cargo compartment of a vehicle by a plurality of users to perform a control process, the control process comprising:
    acquiring, from a provider of the vehicle, target range information regarding designation of a range of users who use the cargo compartment of the vehicle, the target range information including relationship designation information between the provider of the vehicle and the range of users, personal information of the range of users, and designation of permission of a plurality of unspecified users of the range of users;
    receiving user registration information including attributes of a user who desires use of the cargo compartment of the vehicle, the user registration information including information corresponding to the target range information;
    determining, based on the target range information and the user registration information, whether the use of the cargo compartment of the vehicle by the user is permitted or not, the use of the cargo compartment of the vehicle by the user being permitted when the attributes of the user who desires use of the cargo compartment of the vehicle are included in the target range information;
    issuing, based on the target range information, key information of an electronic key for temporarily unlocking and locking the vehicle to the user who desires use of the cargo compartment of the vehicle; and
    limiting, based on the target range information, a usage place of the electronic key.

8. The non-transitory recording medium according to claim 7, wherein the control process further comprising granting, based on the target range information, an authority to access vehicle information for specifying the vehicle to a user who desires use of the cargo compartment of the vehicle.

9. The non-transitory recording medium according to claim 7, wherein the relationship designation information includes family member designation information for designating a family member of a provider of the vehicle in the range of users or friend designation information for designating a friend of a provider of the vehicle in the range of users, and the personal information includes designation based on at least one category of: sex of the users; age of the users; a regional area in which the users live; and relative reliabilities of the users.

10. An information processing device that manages use of a cargo compartment of a vehicle by a plurality of users, the information processing device comprising a processor configured to:
  acquire, from a provider of the vehicle, target range information regarding designation of a range of users who use the cargo compartment of the vehicle, the target range information including relationship designation information between the provider of the vehicle and the range of users, personal information of the range of users, and designation of permission of a plurality of unspecified users of the range of users;
  receive user registration information including attributes of a user who desires use of the cargo compartment of the vehicle, the user registration information including information corresponding to the target range information;
  determine, based on the target range information and the user registration information, whether the use of the cargo compartment of the vehicle by the user is permitted or not, the us of the cargo compartment of the vehicle by the user being permitted when the attributes of the user who desires use of the cargo compartment of the vehicle are included in the target range information;
  issue, based on the target range information, key information of an electronic key for temporarily unlocking and locking the vehicle to the user who desires use of the cargo compartment of the vehicle; and
  limit, based on the target range information, a usage place of the electronic key.

* * * * *